US009385940B2

(12) United States Patent
Sato

(10) Patent No.: US 9,385,940 B2
(45) Date of Patent: Jul. 5, 2016

(54) DISTRIBUTED PROCESSING SYSTEM, DISTRIBUTED PROCESSING DEVICE, ROUTING TABLE CREATION METHOD AND PROGRAM RECORDING MEDIUM

(75) Inventor: Tadashi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 14/006,835

(22) PCT Filed: Mar. 21, 2012

(86) PCT No.: PCT/JP2012/058031
§ 371 (c)(1),
(2), (4) Date: Sep. 23, 2013

(87) PCT Pub. No.: WO2012/128387
PCT Pub. Date: Sep. 27, 2012

(65) Prior Publication Data
US 2014/0019508 A1    Jan. 16, 2014

(30) Foreign Application Priority Data

Mar. 24, 2011    (JP) .................................. 2011-066204

(51) Int. Cl.
*G06F 15/16*    (2006.01)
*H04L 12/721*    (2013.01)
(Continued)

(52) U.S. Cl.
CPC .............. *H04L 45/14* (2013.01); *H04L 47/125* (2013.01); *H04L 45/021* (2013.01); *H04L 45/028* (2013.01); *H04L 45/54* (2013.01); *H04L 47/122* (2013.01)

(58) Field of Classification Search
CPC ..... H04L 47/125; H04L 47/122; H04L 45/14; H04L 45/021; H04L 45/028; H04L 45/54
See application file for complete search history.

(56) References Cited

U.S. PATENT DOCUMENTS

2009/0247207 A1* 10/2009 Lor ................... H04L 29/12132
455/517

FOREIGN PATENT DOCUMENTS

EP         1926276 A1 *  5/2008  ............. H04L 29/08
JP    2008-299586 A    12/2008

OTHER PUBLICATIONS

Stoica, Ion, Robert Morris, David Liben-Nowell, Kavid R. Karger, M. Frans Kaashock, Frank Dabek, and Hari Balakrishnan, "Chord: A Scalable Peer-to-Peer Lookup Protocol for Internet Applications", IEEE/ACM Transactions on Networking, vol. 11, No. 1, Feb. 2003.*

(Continued)

*Primary Examiner* — Patrice Winder
*Assistant Examiner* — Nam Tran
(74) *Attorney, Agent, or Firm* — Sughrue Mion, PLLC

(57) ABSTRACT

For providing a technology capable of balancing a CPU load and a network load independently, a distributed processing system includes one or more distributed processing devices in a structured P2P network, and the distributed processing device is provided with a key holding means for holding a routing key which is a key (value) for which order relation is defined and used for routing data, and an event key which a key (value) for which order relation is defined with relation to the routing key, and is used for management of data; a distributed processing device initializing means for registering into a routing table a tuple including the event key and an address of the distributed processing device holding the routing key which has a predetermined relation with the routing key held in the key holding means; and a routing table storing means for storing the routing table holding the tuple.

14 Claims, 21 Drawing Sheets

(51) Int. Cl.
  *H04L 12/803* (2013.01)
  *H04L 12/759* (2013.01)
  *H04L 12/741* (2013.01)
  *H04L 12/755* (2013.01)

(56) References Cited

OTHER PUBLICATIONS

Ion Stoica et al., "Chord: A Scalable Peer-to-Peer Lookup Protocol for Internet Applications", IEEE/ACM Transactions on Networking, Feb 2003, pp. 17-32, vol. 11, No. 1.

David R. Karger et al., "Simple Efficient Load Balancing Algorithms for Peer-to-Peer Systems", SPAA '04 Proceedings of the Sixteenth annual ACM symposium on parellelism in algorithms and architectures 2004, pp. 1-6.

Gurmeet Singh Manku et al., "Symphony: Distributed Hashing in a Small World", USITS '03 Proceeings of the 4th conference on USENIX Symposium on Internet Technologies and Systems, 2003, 14 pgs., vol. 4.

Kiyoshi Ueda et al., "IP Network Adaptive P2P Network Topology Control", The Journal of the Institute of Electronics, Information and Communication Engineers, Nov. 2009, pp. 1750-1763, vol. J92-B, No. 11.

Takahiro Maebashi et al., "Implementation of Distributed System for Large-Scale Data Processing and Its Application", The Transactions of the Institute of Electronics, Information and Communications Engineers, Jul. 2010, pp. 1072-1081, vol. J93-D, No. 7.

Fumiaki Sato, "Configuration Method for Hierarchical DHT Systems Based on Join/Leave Ratio", Journal of Information Processing Society of Japan, Feb. 2010, pp. 418-428, vol. 51, No. 2.

International Search Report for PCT/JP2012/058031 dated May 1, 2012.

\* cited by examiner

Fig.4

| RANGE FOR A KEY | NUMBER OF GENERATION PER UNIT TIME |
|---|---|
| 0 – 7 | 16 |
| 8 – 39 | 4 |
| 40 – 103 | 2 |
| 104 – 105 | 64 |
| 106 – 109 | 32 |
| 110 – 111 | 64 |
| 112 – 127 | 8 |
| 128 – 255 | 1 |

Fig.5

| DISTRIBUTED PROCESSING DEVICE ID | TRANSFER NUMBER OF EVENT DATA | NUMBER OF NOTIFIED EVENT DATA |
|---|---|---|
| 31 | 1936 | 1792 |
| 63 | 2416 | 640 |
| 95 | 4224 | 512 |
| 127 | 784 | 4224 |
| 159 | 1280 | 256 |
| 191 | 1472 | 256 |
| 223 | 1712 | 256 |
| 255 | 2560 | 256 |

Fig.6

| DISTRIBUTED PROCESSING DEVICE ID | TRANSFER NUMBER OF EVENT DATA | NUMBER OF NOTIFIED EVENT DATA |
|---|---|---|
| 7 | 1664 | 1024 |
| 39 | 1664 | 1024 |
| 103 | 3456 | 1024 |
| 105 | 1664 | 1024 |
| 109 | 1792 | 1024 |
| 111 | 1664 | 1024 |
| 127 | 1664 | 1024 |
| 255 | 3584 | 1024 |

Fig.7

| ROUTING KEY | EVENT KEY | TRANSFER NUMBER OF EVENT DATA | NUMBER OF NOTIFIED EVENT DATA |
|---|---|---|---|
| 31 | 7 | 2048 | 1024 |
| 63 | 39 | 2048 | 1024 |
| 95 | 103 | 2048 | 1024 |
| 127 | 105 | 2048 | 1024 |
| 159 | 109 | 2048 | 1024 |
| 191 | 111 | 2048 | 1024 |
| 223 | 127 | 2048 | 1024 |
| 255 | 255 | 2048 | 1024 |

Fig.9

| INITIAL VALUE | ROUTING KEY | EVENT KEY | ADDRESS |
|---|---|---|---|
| | | | |
| | | | |
| | | | |

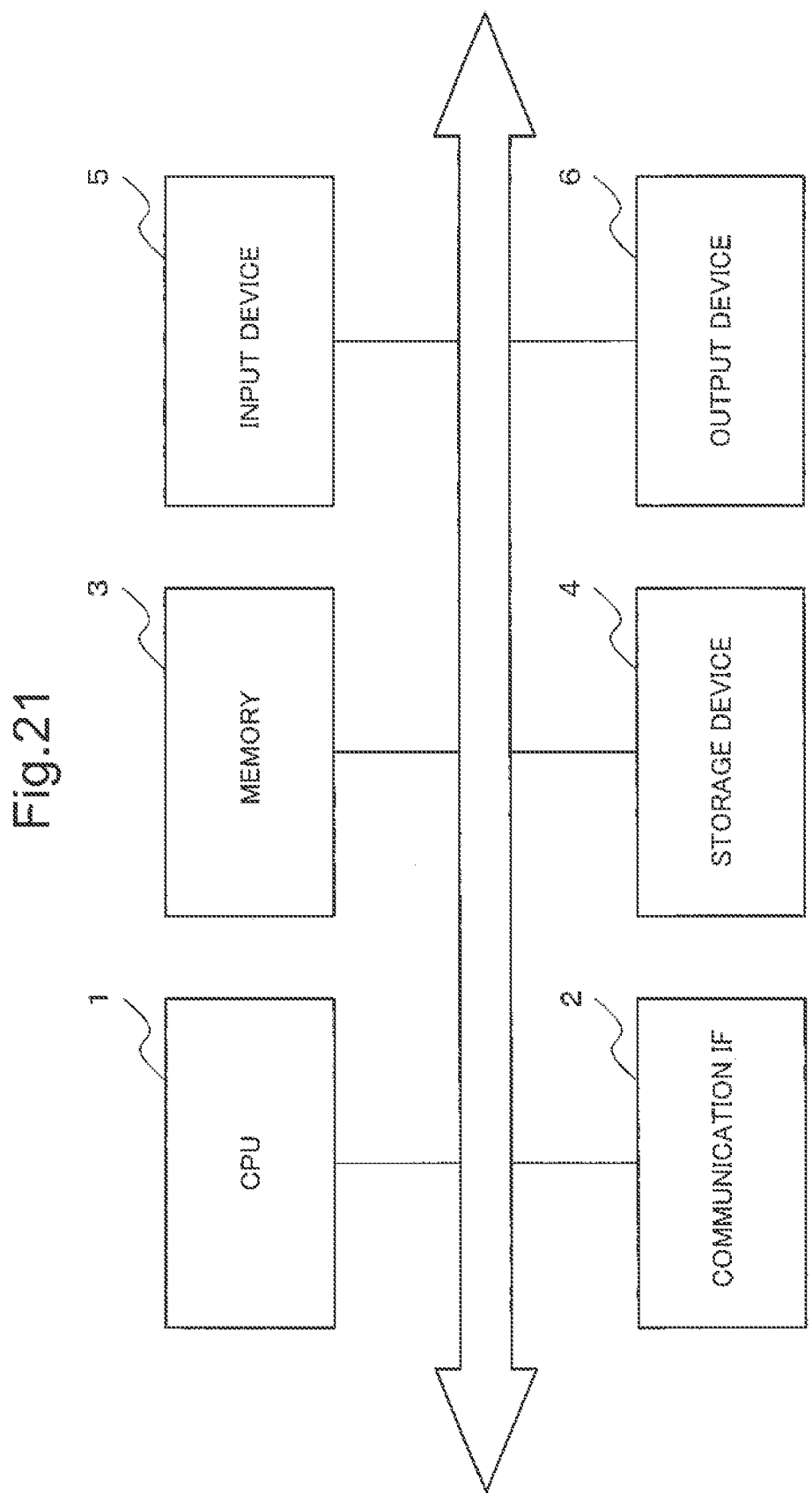

DISTRIBUTED PROCESSING SYSTEM, DISTRIBUTED PROCESSING DEVICE, ROUTING TABLE CREATION METHOD AND PROGRAM RECORDING MEDIUM

CROSS REFERENCE TO RELATED APPLICATIONS

This application is a National Stage of International Application No. PCT/JP2012/058031 filed Mar. 21, 2012, claiming priority based on Japanese Patent Application No. 2011-066204 filed Mar. 24, 2011, the contents of all of which are incorporated herein by reference in their entirety.

TECHNICAL FIELD

The present invention relates to a distributed processing system in which a plurality of distributed processing devices cooperate mutually and perform distributed processing in order to process a lot of event data at high speed.

BACKGROUND ART

FIG. 1 is a diagram showing an outline of a distributed processing system which communicates with other distributed processing devices via a network connected with a transmission medium such a LAN cable. As an example, four distributed processing devices of a distributed processing device 100, a distributed processing device 200, a distributed processing device 300 and a distributed processing device 400 are connected in FIG. 1.

In the distributed processing system shown in FIG. 1, the distributed processing devices cooperate, and transmit event data to the distributed processing device which should process the event data. A distributed processing device of a transmission destination processes the transmitted event data. In order to transmit to other distributed processing devices, the distributed processing device stores the addresses of several other distributed processing devices. When transmitting the event data, the distributed processing device determines an address which becomes a destination of the event data from the stored address group following a predetermined procedure so that the distributed processing device which should process the event data finally may be reached.

Further, event data is data which is generated every moment by an external system of a distributed processing system and processed with an application built on the distributed processing system. Specifically, event data is data which generates in large quantities from devices such as RFID (Radio Frequency IDentification) including a non-contact IC card and a sensor, and for example, is position information or the like sent periodically from a cellular phone.

Non-patent document 1 discloses a method for performing routing efficiently in a structured P2P (Peer-to-Peer) network. In a routing algorithm (it is called as "Chord" hereinafter.) described in non-patent document 1, a distributed processing device makes a value (key) of m bit length an identifier (distributed processing device ID). Event data is processed with a successor of the hash value (key). A successor of key k is a distributed processing device which makes the value with the smallest distance from key k among distributed processing devices which constitute a distributed processing system an identifier. Further, a distributed processing device which makes the value with the largest distance from key k an identifier is called a predecessor of key k contrary to the successor.

It is common that there is bias in the value for event data processed by a distributed processing system. For example, when position information is sent periodically as event data from a portable terminal which a person carries, position information on an area where a person crowds increases compared with position information on an area which is not so. By the bias of the event data value, a bias also generates about a key generated from there.

The processing load (CPU load) of the event data in a distributed processing device is proportional to the number of the event data which should be processed. On the other hand, the volume of data (network load) that a transmission medium between the distributed processing device and the network is carrying is proportional to the sum of the number of the event data which should be transmitted and the number of the event data which should be processed.

Non-patent document 2 discloses an algorithm for equalizing a CPU load or network load by "3. ITEM BALANCING". A method of non-patent document 2 changes the distributed processing device ID so that a load of each distributed processing device may become equal.

PRIOR ART LITERATURE

Non-Patent Document

[Non-patent document 1] Chord—A Scalable Peer-to-Peer Lookup Service for Internet Applications
[Non-patent document 2] Simple Efficient Load Balancing Algorithms for Peer-to-Peer Systems

SUMMARY

Problem to be Solved by the Invention

A system of non-patent document 2 makes either a CPU load or network load uniform between distributed processing devices by adjusting the distributed processing device ID to the routing algorithm such as Chord, for example. However, making one load uniform will influence on a balance of other load. Therefore, when the system of non-patent document 2 is applied to the routing algorithm such as Chord, both of a CPU load and a network load cannot be balanced simultaneously.

From above, a purpose of the present invention is to provide a technology capable of balancing a CPU load with a network load independently.

Solution to Problem

A distributed processing system of one exemplary embodiment of the present invention includes one or more distributed processing devices in a structured P2P network, wherein the distributed processing device comprises: a key holding means for holding a routing key which is a key (value) for which order relation is defined and used for routing data, and an event key which a key (value) for which order relation is defined with relation to the routing key, and is used for management of data; a distributed processing device initializing means for registering into a routing table a tuple including the event key and an address of the distributed processing device holding the routing key which has a predetermined relation with the routing key held in the key holding means; and a routing table storing means for storing the routing table holding the tuple.

A distributed processing device of one exemplary embodiment of the present invention is on a structured P2P network, and comprises: a key holding means for holding a routing key which is a key (value) for which order relation is defined and is used for routing data, and an event key which is a key (value) for which order relation is defined with relation to the routing key, and is used for management of data; a distributed processing device initializing means for registering into a routing table a tuple including the event key and an address of the distributed processing device holding the routing key which has a predetermined relation with the routing key held in the key holding means; and a routing table storage means for storing the routing table holding the tuple.

A routing table creation method in a distributed processing system of one exemplary embodiment of the present invention includes one or more distributed processing devices in a structured P2P network, the method comprising: holding a routing key which is a key (value) for which order relation is defined and used for routing data, and an event key which is a key (value) for which order relation is defined with relation to the routing key, and is used for management of data; registering into a routing table a tuple including the event key and an address of the distributed processing device holding the routing key which has the predetermined relation with the routing key; and storing the routing table holding the tuple.

A recording medium of one exemplary embodiment of the present invention stores a program which makes a distributed processing device on a structured P2P network execute processing, the processing comprising: holding a routing key which is a key (value) for which order relation is defined and used for routing data, and an event key which is a key (value) for which order relation is defined with relation to the routing key, and is used for management of data; registering into a routing table a tuple including the event key and an address of the distributed processing device holding the routing key which has a predetermined relation with the routing key; and storing the routing table holding the tuple.

Effect of the Invention

According to the present invention, a CPU load can be balanced with a network load independently. The reason is because the role for a transmission of event data and the role for dividing a management section of event data which one key had played so far were separated as the role of each two keys.

BRIEF DESCRIPTION OF THE DRAWINGS

FIG. 4 It is a diagram showing an example of a generation frequency of each key.

FIG. 5 It is a diagram showing the transfer number of event data and the number of notified event data for each distributed processing device in FIG. 3 when the key becomes the distribution shown in FIG. 4.

FIG. 6 It is a diagram showing the state that the distributed processing device ID was changed by the method of non-patent document 2.

FIG. 7 It is a diagram for explaining the effect of the present invention.

FIG. 9 It is a diagram showing a constructional example of a routing table which a routing table storage unit 113 stores.

FIG. 21 It is a block diagram showing an example of a hardware configuration of a distributed processing device 500 according to the second exemplary embodiment.

DESCRIPTION OF THE PREFERRED EMBODIMENTS

First, in order to understand an exemplary embodiment of the present invention easily, a background of the present invention will be described.

When a system of non-patent document 2 is applied to a routing algorithm such as Chord, both of a CPU load and a network load cannot be balanced simultaneously. Hereinafter, the reason is described taking the case of Chord about a routing algorithm of a structured P2P (Peer-to-Peer) network.

In Chord, a distributed processing device holds addresses of several other distributed processing devices in order to transmit event data to other distributed processing devices. Those addresses are the addresses of a successor of key s (initial value) whose distance from the identifier of the distributed processing device is $2^{(i-1)}$ ($i=1$ and $2, \ldots, m$). The initial value is a value which becomes a cardinal point for determining a distributed processing device registered in a routing table here.

Figure 2:
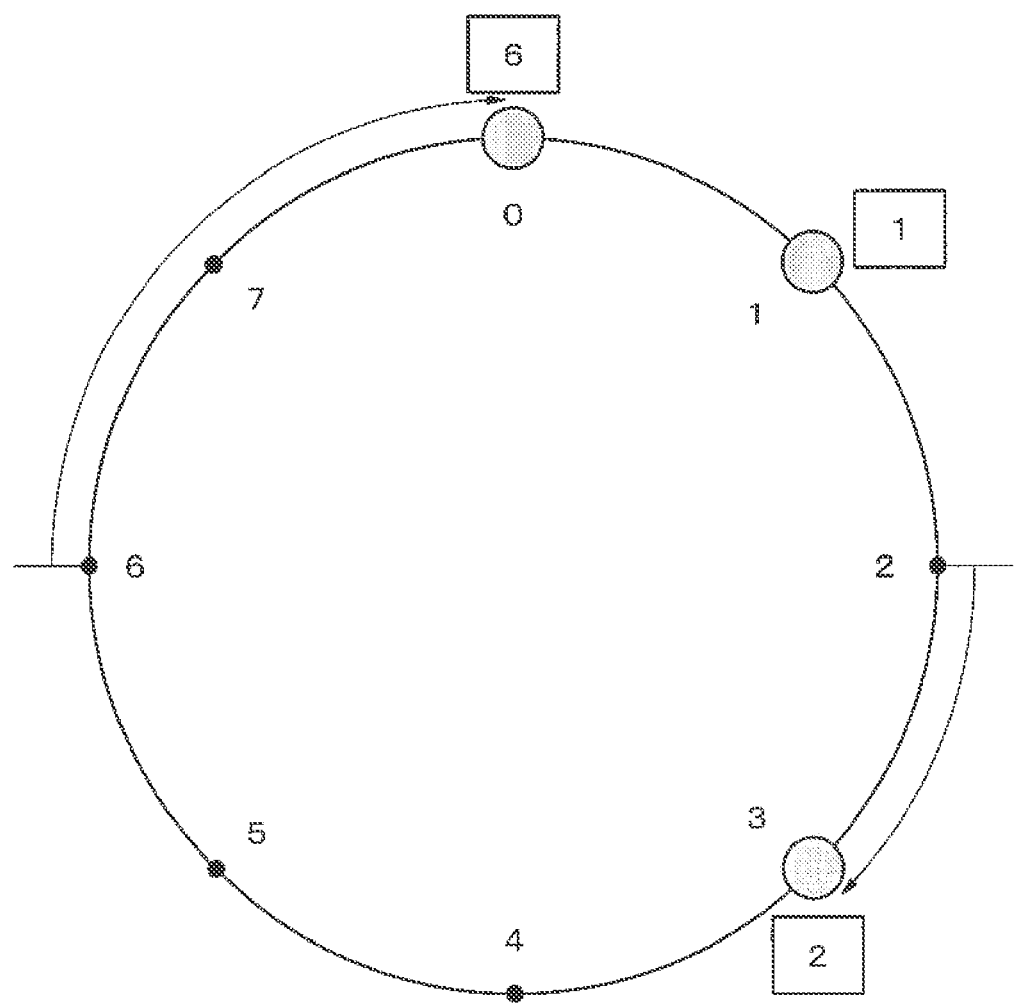
FIG. 2 It is a diagram for explaining a concept of a key in Chord.

FIG. 2 is a diagram for explaining a concept of a key in Chord. As shown in FIG. 2, the key is expressed by a circle of modulo $2^m$. The modulo is the integer arithmetic which obtains the rest by division here. For example, when an integer a is divided by an integer n, the rest is expressed as a mod n. A key whose distance from any key k is d will be $(k+d)$ mod $2^m$.

In an example of FIG. 2, it will be m=3 and a key whose distance is 2 from a key 7 is (7+2) mod 2^3=1. As shown in FIG. 2, the distance can be defined as "the clockwise distance" between nodes in Chord.

Event data is processed with a successor of its hash value (key). A successor of key k is the distributed processing device which makes the value with the smallest distance from key k among distributed processing devices which constitute a distributed processing system an identifier.

As mentioned above, the event data is processed by a distributed processing device (successor) which makes the value which is a value with the smallest distance from key k which is its hash value the identifier. FIG. 2 shows a specific example and shows that a successor of key k is a distributed processing device which counts clockwise from key k and is in the closest distance.

In FIG. 2, the case that the distributed processing device ID is three of 0, 1 and 3 is shown about a distributed processing device. FIG. 2 shows that a successor of key 2 is the distributed processing device of the distributed processing device ID of 3. FIG. 2 also shows that a successor of key 6 is the distributed processing device of the distributed processing device ID of 0.

Figure 3:
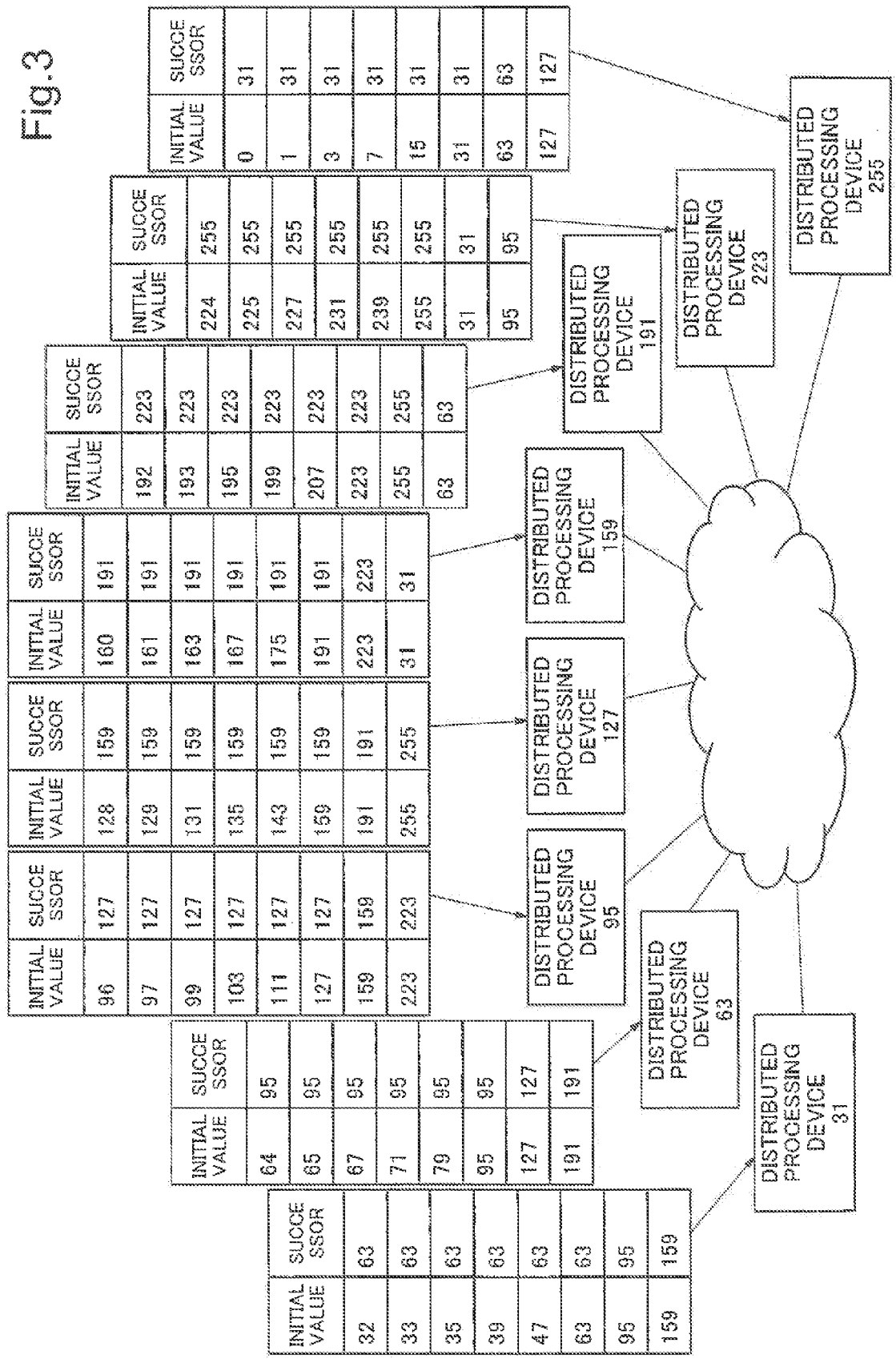
FIG. 3 It is a diagram showing an example of an identifier that each distributed processing device in a distributed processing system stores.

FIG. 3 is a diagram showing an example of the identifier which each distributed processing device in a distributed processing system stores. FIG. 3 shows an example of m=8. A value written in the block of a distributed processing device in FIG. 3 is the identifier (the distributed processing device ID) of the distributed processing device, and the key of 8 bit is shown with a code-less integer. The table in the upper part of each distributed processing device is an initial value and the identifier of the successor which a distributed processing device under it stores. Because an address of each successor is correlated with the identifier in 1 to 1, description thereof is omitted.

For example, an initial value when being i=1 about a distributed processing device of the identifier of 191, will be 191+2^(1−1)=192 (mod 2^8). An initial value when being i=8, will be 191+2^(−1)=63 (mod 2^8).

FIG. 4 is a diagram showing an example of a generation frequency of each key. FIG. 4 shows an example which generates event data which calculates the key as the hash value 16 times a second, for example about keys 0 to 7, respectively. In FIG. 4, the generation frequency of the event data from which a key is set to 104, 105, 110 and 111 is the highest. FIG. 4 is a diagram which classified event data which occurred by a biased frequency intentionally in advance by the related technology.

A case that each distributed processing device of FIG. 3 receives event data which becomes the key distribution shown in FIG. 4 from an external system is considered. The event data number that each distributed processing device receives will be 8×16+32×4+64×2+2×64+4×32+2×64+16×8+128×1=1024 event data/second from FIG. 4. Therefore, in the distributed processing system including eight distributed processing devices, total number of the received event data will be 1024× 8=8192 event data/second.

FIG. 5 is a diagram showing the number of event data transfer and the number of notified event data of each distributed processing device of FIG. 3 in a case which becomes the key distribution shown in FIG. 4. The number of event data transfer of the distributed processing device is the number of the event data by which the distributed processing device transmitted to other distributed processing device after receiving the event data from an external system or other distributed processing device. The number of notified event data of a distributed processing device is the number by which the distributed processing device received an event as a final arrival destination.

Because a distributed processing device in one arrival destination exists in an event which a distributed processing device receives from an external system respectively, sum 1792+640+512+4224+256+256+256+256=8192 of the number of notified event data of FIG. 5 is identical to the total number of the event which all distributed processing devices receive.

The processing load (CPU load) of the event data in the distributed processing device is proportional to the number of notified event data of FIG. 5. However, although a distributed processing device executes application based on transmitted event data, it is assumed that the application execution load to each event data is same. The processing load for event data to transmit is generally small sufficiently compared with a load of application execution. Therefore, a bias of a number of notified event data represents a bias of a CPU load of a distributed processing device.

The volume of data (network load) that a transmission medium between the distributed processing device and the network is carrying is proportional to the sum of a number of event data transfer and a number of notified event data. It is because the transmission and the notification of event data are performed via a transmission medium between the distributed processing device and the network. Therefore, a bias of those totals represents a bias of a network load of a distributed processing device.

Here, making a CPU load uniform with a system of non-patent document 2 when the hash value of the event data is the distribution shown in FIG. 4. In this case, in order to make the number of notified event data uniform, the system of non-patent document 2 changes the distributed processing device ID.

FIG. 6 is a diagram showing the state that the distributed processing device ID was changed with the system of non-patent document 2. As shown in FIG. 6, because total number of the event which application of eight distributed processing devices receive are 8192 event data/second, the CPU load becomes uniform by setting 8192/8=1024 event data/second per one distributed processing device.

For example, the distributed processing device (hereinafter, referred to as the distributed processing device (39)) by which the distributed processing device ID is 39 in FIG. 6 takes charge of the keys from 8 to 39. The event data number that application of a distributed processing device (39) processes can be calculated by multiplying number of the distributed processing device and a generation frequency to the number of the key of which the distributed processing device takes charge as (39−8+1)×8=1024. However, here, it is assumed that all distributed processing devices are equipped with a CPU of the equal performance.

When the network load is made uniform, the system of non-patent document 2 changes the ID for each distributed processing device so that the sum of the number of event data transfer and the number of notified event data may become uniform between the distributed processing devices.

However, when the system of non-patent document 2 is applied, both of the CPU load and the network load cannot be balanced simultaneously. For example, in FIG. 6, the number of notified event data is same in all distributed processing devices. However, because the number of event data transfer is different for each distributed processing device, the network load is different for each distributed processing device. In the example of FIG. 6, it is found that it takes a large network load for the distributed processing device by which the ID is 103 and 255 in particular compared with other distributed processing devices.

Thus, even when the system of non-patent document 2 is applied in Chord, even if one load can be made uniform, a load may concentrate on a specific distributed processing device for other load. When a load concentrates on a specific distributed processing device, the distributed processing device will be a bottleneck, and a performance as a distributed processing system declines.

According to an exemplary embodiment of the present invention described below, a network load can be balanced with a CPU load independently as shown in FIG. 7 by dividing a key into two for each role (to divide a management section and to become a guideline of routing). Further, in the following description, it is assumed that all distributed processing devices have CPUs of the equal performance and also connected with a network via a transmission medium of the equal transmission performance.

First Exemplary Embodiment

Figure 1:
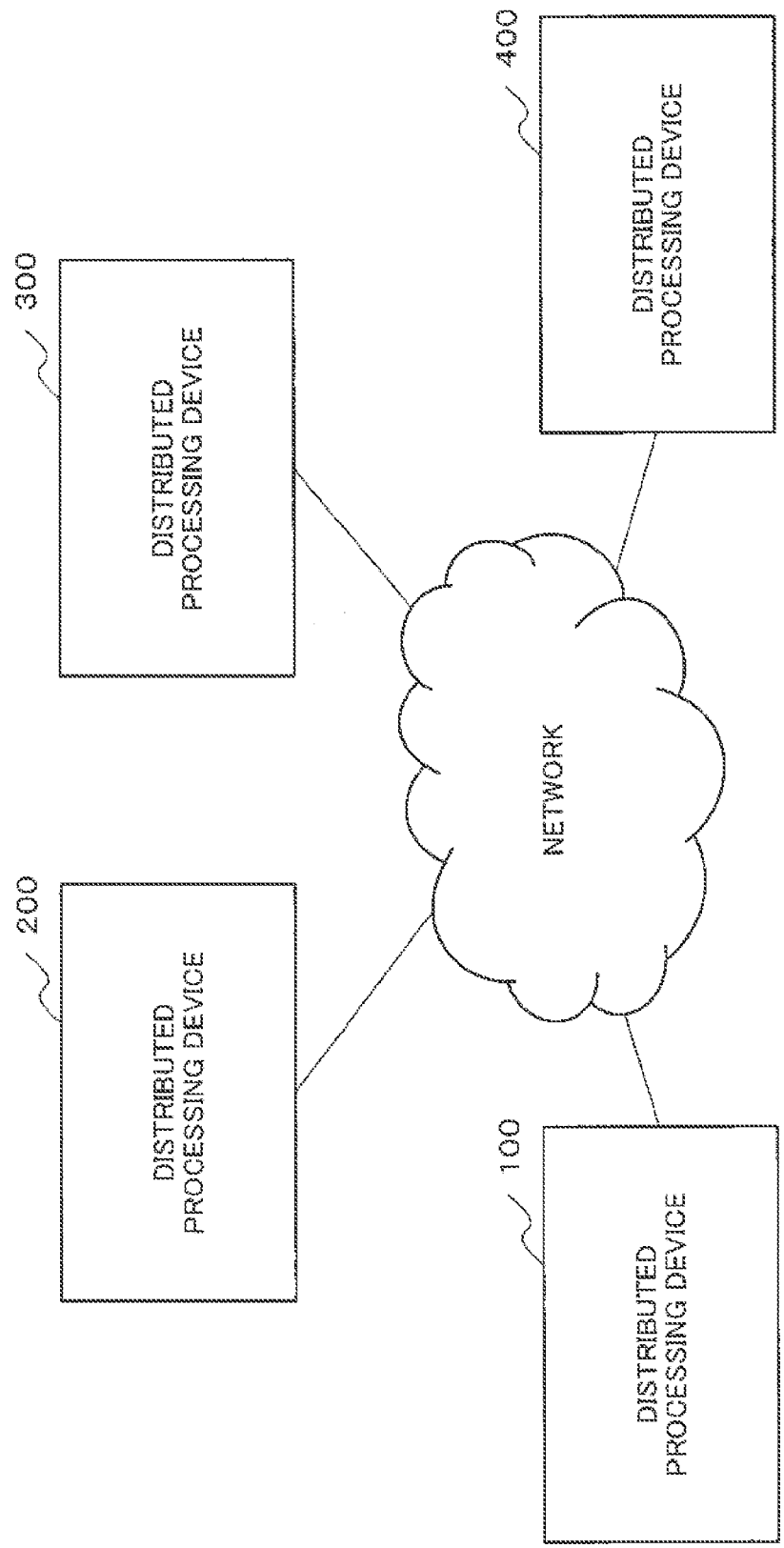
FIG. 1 It is a diagram showing an outline of a distributed processing system.

A distributed processing system in a first exemplary embodiment includes one or more distributed processing device as shown in FIG. 1. The distributed processing device holds a routing key and an event key which are values of a predetermined number (m) bit to which an order relation is defined.

Here, a routing key is a key used for a transmission (routing) of event data. An event key is a key for dividing a management section of event data. In this exemplary embodiment, although the event key is set to m bit lengths, it is not necessary to be the fixed length as long as the order relation thereof should be defined. The distance is defined like a case of Chord for a routing key and an event key.

The distributed processing device which should process event data is decided by the event data concerned and an event key of each distributed processing device. Specifically, a distributed processing device which should process event data is a distributed processing device (successor) which holds a value with the smallest distance from the event key obtained by carrying out an operation to event data as an event key. The event key may be the hash value obtained from event data using a hash function, but it is not limited to this.

Here, in this exemplary embodiment, an order relation is defined for a routing key and an event key by a predetermined relation. Routing keys of distributed processing devices x, y and z are expressed as xr, yr and zr for the explanation. Event keys thereof are expressed as xe, ye and ze. In this case, when it is (the distance from xr to yr)<(the distance from xr to zr), it must become (the distance from xe to ye)<(the distance from xe to ze) in this exemplary embodiment. By satisfying this condition, the distributed processing system can send event data gradually but efficiently closer to the distributed processing device which should process the event data. Specifically, the distributed processing system can transmit event data to the distributed processing devices which should process the event data with the transfer number of times of the order of log_2 (the number of the distributed processing devices).

Here, a successor and a predecessor are defined as follows.
Successor of any routing key: A distributed processing device with the value, as its routing key, which is closest to the routing key or which has the smallest distance from the routing key.
Predecessor of any routing key: A distributed processing device with the value, as its routing key, which is farthest from the routing key or which has the largest distance from the routing key.
Successor of any event key: A distributed processing device with the value, as its event key, which is closest to the event key or which has the smallest distance from the event key.
Predecessor of an any event key: A distributed processing device with the value, as its event key, which is farthest from the event key or which has the largest distance from the event key.
Successor of any distributed processing device: A successor of a routing key of which distance from the routing key of the distributed processing device is 1.
Predecessor of any distributed processing device: A predecessor of a routing key of the distributed processing device.

Figure 8:
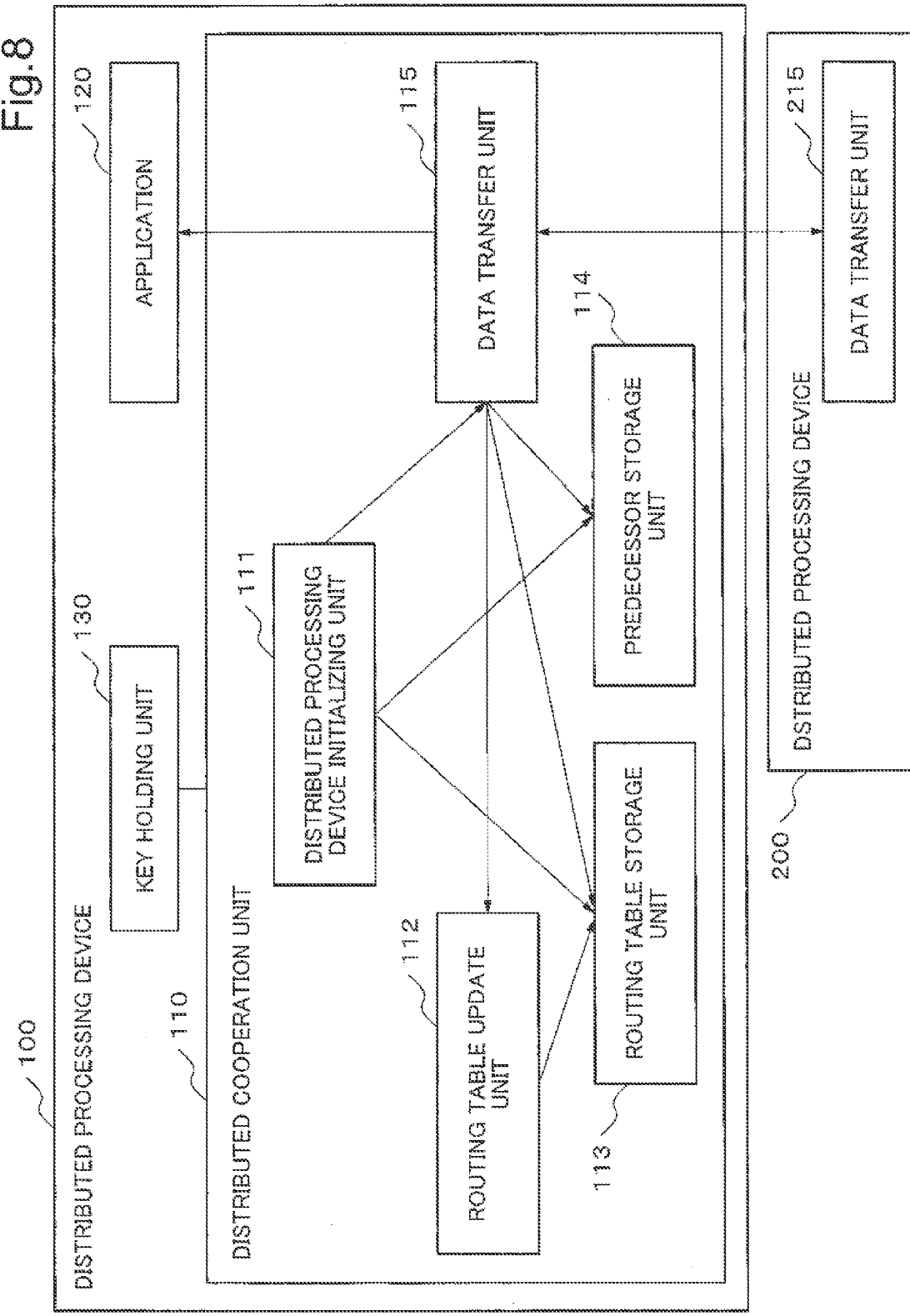
FIG. 8 It is a diagram showing an example of configuration of a distributed processing device 100 in a first exemplary embodiment.

FIG. 8 is a diagram showing an example of configuration of a distributed processing device 100 in a first exemplary embodiment. In FIG. 8, the distributed processing device 100 sends and receives event data with other distributed processing device 200 via a data transfer unit 111 and a data transfer unit 215.

The distributed processing device 100 includes a distributed cooperation unit 110, an application 120 which performs predetermined processing to event data and a key holding unit 130 which holds a routing key and an event key of the self-device which is the distributed processing device 100.

The key holding unit 130 holds a routing key and an event key. A routing key is a key (value) for which an order relation is defined, and is a key used for routing data. An event key is a key (value) for which an order relation is defined, and is a key used for management of data.

The distributed cooperation unit 110 includes a distributed processing device initializing unit 111, a routing table update unit 112, a routing table storage unit 113, a predecessor storage unit 114 and a data transfer unit 115.

When a new distributed processing device (hereinafter, referred to as a new distributed processing device) is added to the distributed processing system, the distributed processing device initializing unit 111 operates. When a new distributed processing device is added, the distributed processing device initializing unit 111 initializes a routing table which the routing table storage unit 113 in the distributed processing device 100 stores and a stored content of the predecessor storage unit 114. And the distributed processing device initializing unit 111 issues an update request of the routing table (hereinafter, referred to as a routing table update request) to other distributed processing devices (the distributed processing device 200, for example).

The routing table update unit 112 updates the routing table which the routing table storage unit 113 stores based on the routing table update request received from other distributed processing device.

The routing table storage unit 113 holds zero or more of a tuple (it may be called a record) including a routing key, an event key and an address, and stores a routing table used for determining a data transfer destination.

The predecessor storage unit 114 stores a routing key, an event key and an address of a predecessor.

When a received event data is one which the distributed processing device should process, the data transfer unit 115 notifies the event data to the application. When it is not one which the distributed processing device should process, the data transfer unit 115 determines a distributed processing device which becomes a next data transfer destination with reference to the routing table, and transmits the event data to the distributed processing device.

FIG. 9 is a diagram showing a constructional example of a routing table which the routing table storage unit 113 stores. The routing table holds zero or more of tuple including an initial value, a routing key, an event key and an address. The initial value is a value of which distance from the routing key of the distributed processing device 100 is $2^{(i-1)}$ (i=1 and 2, ..., m). The routing key, the event key and the address are a routing key, an event key and an address of a successor of the initial value respectively. When suitable routing and event data management is possible, it will not be limited to particular methods how to decide a value of a routing key and an event key.

Next, operation in each part when adding a distributed processing device 100 to the distributed processing system newly as a new distributed processing device will be described.

Figure 10:
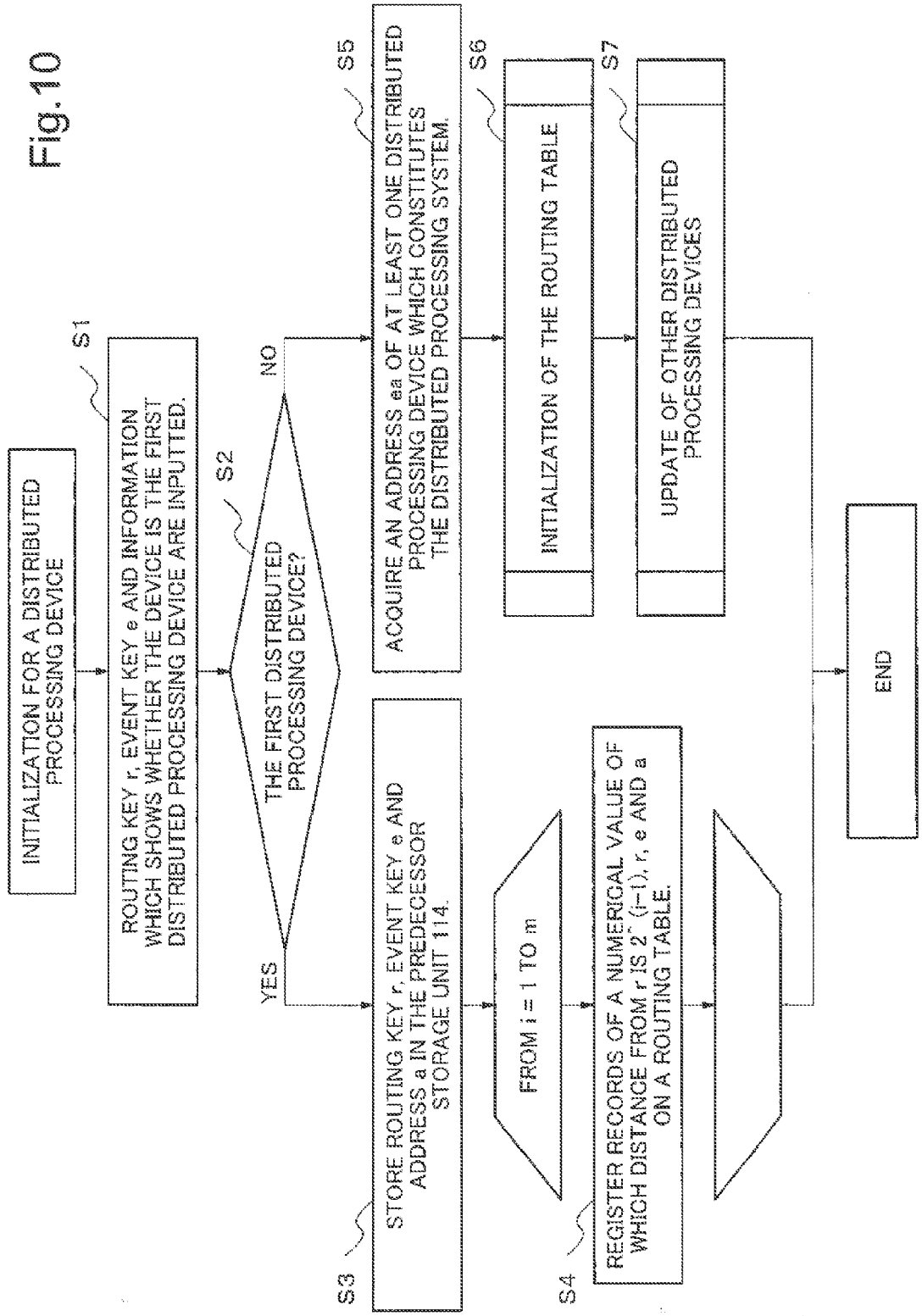
FIG. 10 It is a flow chart diagram of distributed processing device initializing processing which the distributed processing device initializing unit 111 performs.

FIG. 10 is a flow chart diagram of distributed processing device initializing processing which the distributed processing device initializing unit 111 performs. As shown in FIG. 10, when a distributed processing device 100 is added to the distributed processing system as a new distributed processing device, a routing key r, an event key e and information which shows whether it is the first distributed processing device are inputted into the distributed processing device initializing units 111 from an external system (Step S1). Here, r is the concrete value inputted from the external system actually as a routing key. e is the concrete value inputted from the external system actually as an event key. Here, to input means to set data by an operation input of an external system or to receive data from the external system.

In this exemplary embodiment, it is assumed that a routing key and an event key are set by inputting an appropriate value from the external system. The appropriate value can be set by the user who inputs a value, for example, knowing the load status of the entire system in advance. Or although a method for setting it by making reference to statistical data or the like is considered, a setting method of a routing key and an event key is not limited to this.

For example, a routing key may be a hash value of an inherent data of a distributed processing device, such as an IP address which a new distributed processing device stores. When it is known that event data generates uniformly at random, a routing key may be set so that a distance of adjacent distributed processing devices may become almost equal.

When a new distributed processing device is added, for example, an event key may be set so that a CPU load may become the same as a CPU load of a successor of a new distributed processing device.

A routing key and an event key may be set when distributed processing devices notify a CPU load status and a network load status mutually.

Next, the new distributed processing device judges whether the self-device is the first distributed processing device in the distributed processing system from information which shows whether it is the first distributed processing device (Step S2).

When information which shows whether it is the first distributed processing device shows that the new distributed processing device is the first distributed processing device in the distributed processing system, a predecessor and a successor of all routing keys are the new distributed processing device itself. Therefore, in the case, first, the distributed processing device initializing unit 111 stores the routing key r, the event key e and the address a of the self-device in the predecessor storage unit 114 (Step S3).

Next, a distributed processing device initializing unit 111 registers a tuple which set an initial value, a routing key, an event key and an address to a value of which distance from r is $2^{(i-1)}$, r, e and a, respectively in the routing table for i=1 to m (Step S4).

When information which shows whether it is the first distributed processing device does not show that a new distributed processing device is the first distributed processing device, the distributed processing device initializing unit 111 acquires an address ea of at least one distributed processing device of which the distributed processing system is composed (Step S5). For example, a default gateway as used in the field of LAN (Local Area Network) registered in advance may be available as this at least one distributed processing device.

Next, the distributed processing device initializing unit 111 performs processing (routing table initializing processing) which initializes the routing table which the routing table storage unit 113 of the new distributed processing device stores, using the distributed processing device of the address ea (Step S6).

Next, the distributed processing device initializing unit 111 performs processing (other distributed processing device update processing) which updates a routing table which the routing table storage unit 113 of other distributed processing devices store via the data transfer unit 115 (Step S7).

Figure 11:
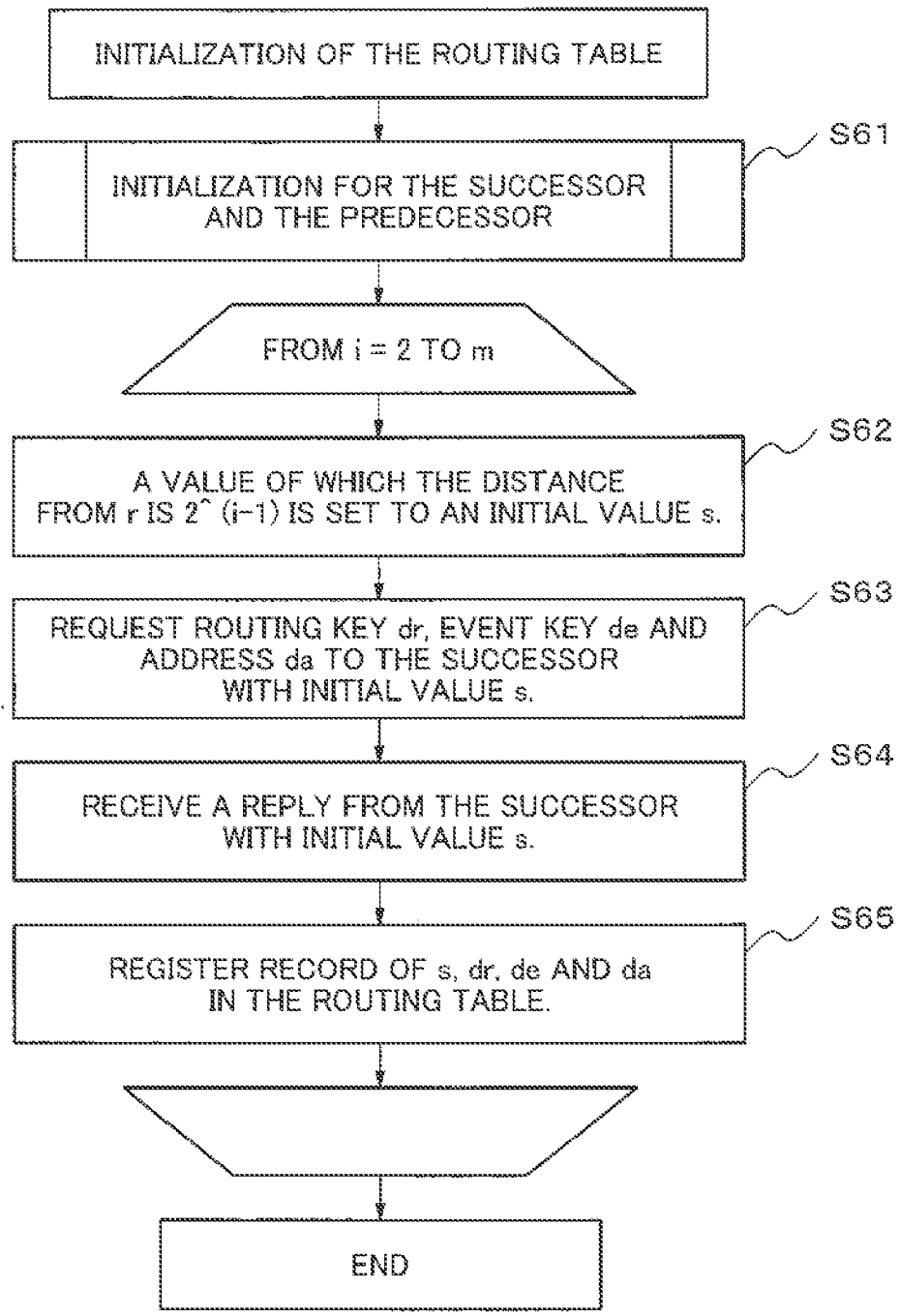
FIG. 11 It is a flow chart diagram of routing table initializing processing which the distributed processing device initializing unit 111 performs.

FIG. 11 is a flow chart diagram of routing table initializing processing which the distributed processing device initializing unit 111 performs in Step S6 of FIG. 10. As shown in FIG. 11, in the routing table initializing processing, the distributed processing device initializing unit 111 performs processing (successor and predecessor initializing processing) which initializes a successor and a predecessor first (Step S61).

In the successor and predecessor initializing processing, an initial value is set to a value whose distance from the routing key r of the new distributed processing device is 1, and a tuple including a routing key, an event key and an address of the initial value concerned and the initial value concerned is stored in the routing table. A routing key, an event key and an address of a predecessor of the routing key r are stored in the predecessor storage unit 114.

Description will be made later of details of the successor and predecessor initializing processing.

In the routing table initializing processing, next, the distributed processing device initializing unit 111 registers a tuple corresponding to i for i=2 to m in the routing table. Specifically, first, the distributed processing device initializing units 111 set a value of which distance from the routing key r is $2^{(i-1)}$ to an initial value s (Step S62).

The distributed processing device initializing unit 111 requests a routing key dr, an event key de and an address da of the successor of the initial value s to the successor of the initial value s (Step S63). The distributed processing device initializing unit 111 issues the request by inputting a message to request the initial value s (in order to show a successor of a target), the routing key dr, the event key de and the address da of the successor of the initial value s to the data transfer unit 115. Hereinafter, a message means the message which requires predetermined information.

The distributed processing device initializing unit 111 receives a reply to the above-mentioned request from the successor of the initial value s via the data transfer unit 115 (Step S64).

A distributed processing device initializing unit 111 registers a tuple which set an initial value, a routing key, an event key and an address to s, dr, de and da respectively in the routing table (Step S65).

Figure 12:
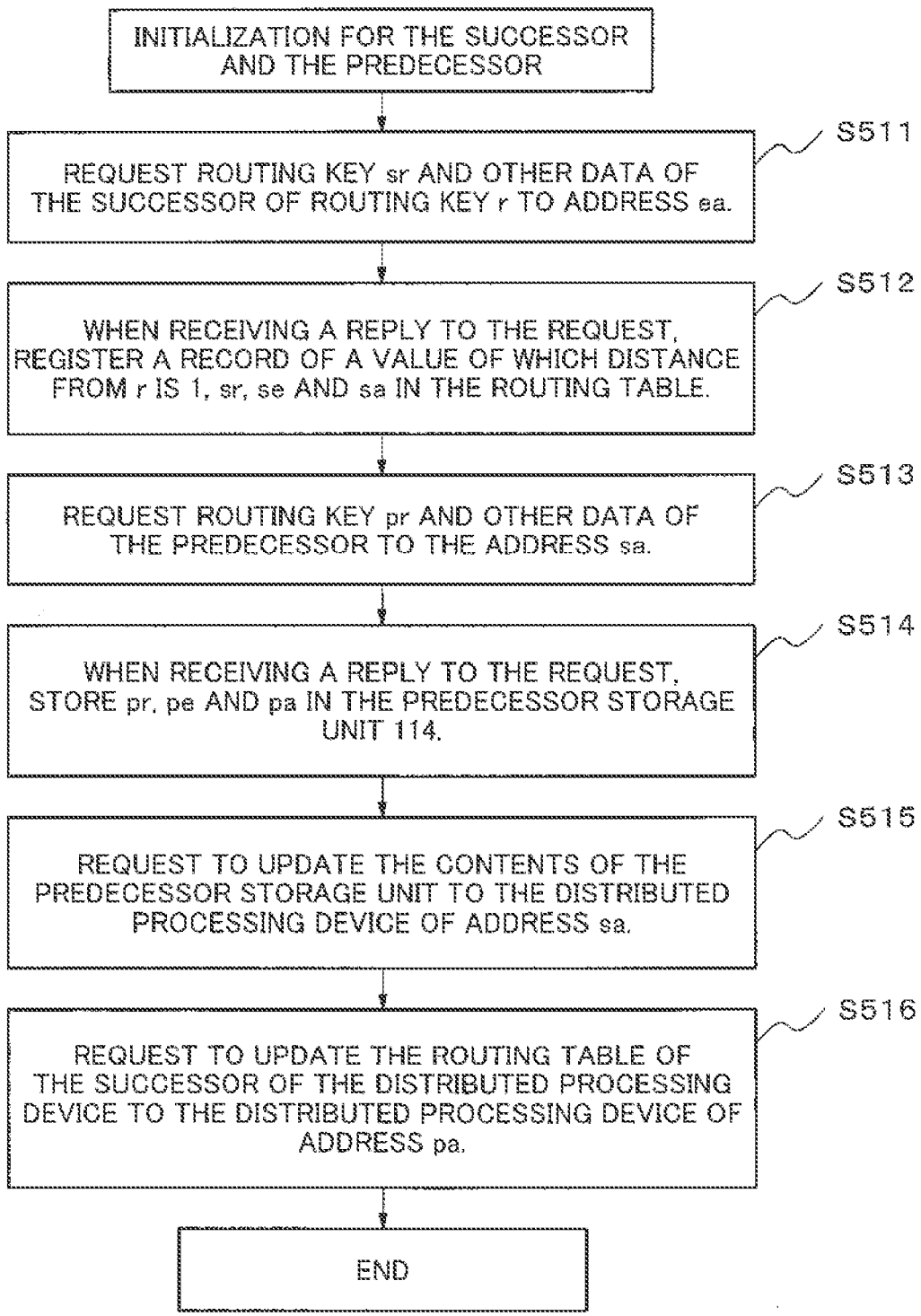
FIG. 12 It is a flow chart diagram of the successor and predecessor initializing processing which the distributed processing device initializing unit 111 performs.

FIG. 12 is a flow chart diagram of the successor and predecessor initializing processing which the distributed processing device initializing unit 111 performs in Step S61 of FIG. 11. As shown in FIG. 12, first, the new distributed processing device performs successor registration processing in Step S511 and Step S512.

That is, the distributed processing device initializing unit 111 requests a routing key sr, an event key se and an address sa of the successor of the routing key r to the distributed processing device of the address ea acquired (Step S511). By the algorithm based on the routing table which the self-device stores, the distributed processing device of the address ea acquires the above-mentioned information from the relevant distributed processing device and transmits the information to a new distributed processing device as a reply.

When the reply to the request is received, the distributed processing device initializing unit 111 registers a tuple which set an initial value, a routing key, an event key and an address to a value of which distance from r is 1, sr, se and sa respectively in the routing table (Step S512).

Next, the new distributed processing device performs predecessor registration processing in Step S513 and Step S514.

That is, a distributed processing device initializing unit 111 requests a routing key pr, an event key pe and an address pa of the predecessor of the distributed processing device of the address sa to the distributed processing device of the address sa (Step S513).

When a reply to the request is received, the distributed processing device initializing unit 111 stores pr, pe and pa in the predecessor storage unit 114 (Step S514).

After that, the new distributed processing device performs predecessor update processing of the successor. That is, a distributed processing device initializing unit 111 requests the distributed processing device of sa to update a routing key, an event key and an address of the predecessor storage unit of the distributed processing device to r, e and a respectively (Step S515).

Finally, the new distributed processing device performs successor update processing of the predecessor. That is, a distributed processing device initializing unit 111 requests the distributed processing device of the address pa to updates a routing key, an event key and an address of a tuple of which initial value is the value of which distance from the routing key of the distributed processing device is 1 to r, e and a respectively (Step S516).

Figure 13:
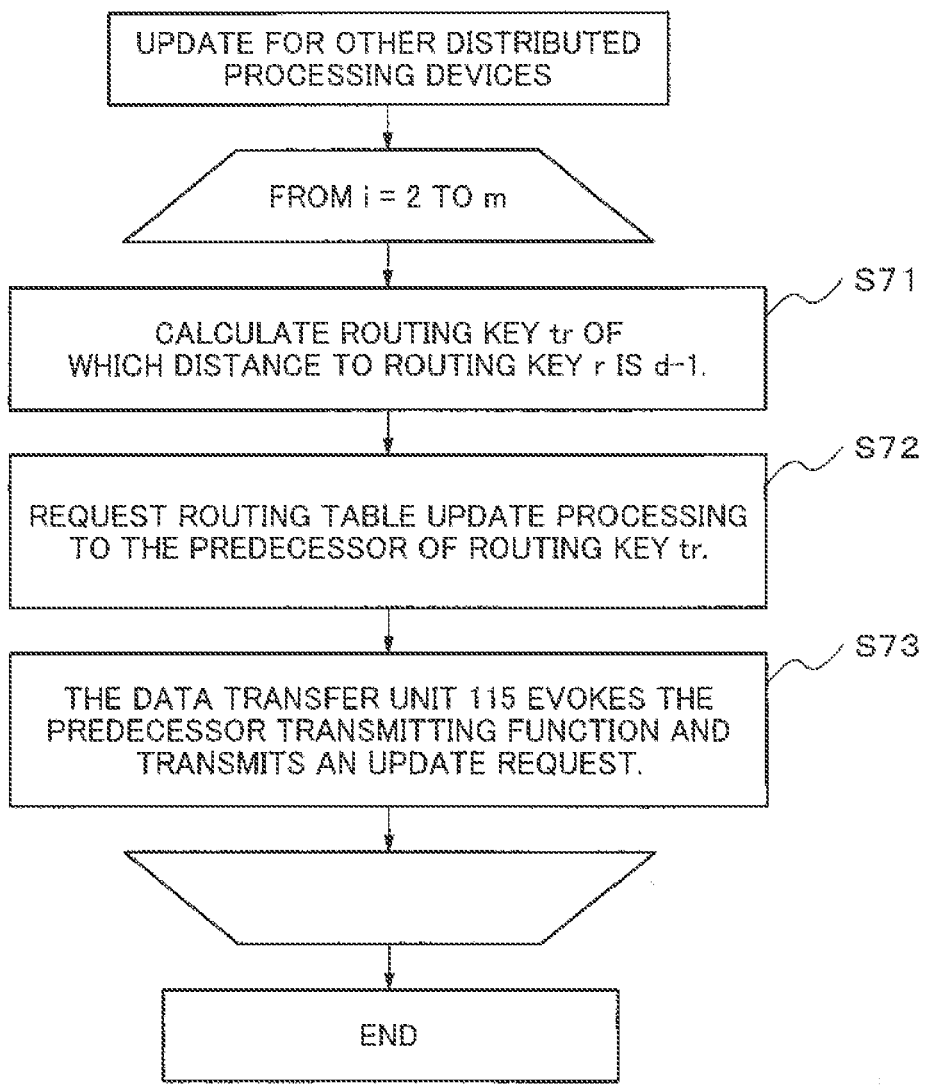
FIG. 13 It is a flow chart diagram of other distributed processing device update processing which the distributed processing device initializing unit 111 performs.

FIG. 13 is a flow chart diagram of other distributed processing device update processing which the distributed processing device initializing unit 111 performs in Step S7 of FIG. 10. First, the distributed processing device initializing unit 111 of a new distributed processing device updates a routing table of the distributed processing device, among other distributed processing devices, whose successor of a value of which distance from the routing key is $2^{(i-1)}$ is the new distributed processing device for i=2 to m.

Specifically, first, the distributed processing device initializing unit 111 calculates the routing key tr whose distance to the routing key r is d−1 (=$2^{(i-1)}$−1) (Step S71).

Next, the distributed processing device initializing unit 111 requests the predecessor of the routing key tr, which was calculated in Step S71, the routing table update processing (Step S72). Specifically, the distributed processing device initializing unit 111 inputs the routing key tr and a routing table update request to the data transfer unit 115.

When the routing table update request is inputted, the data transfer unit 115 evokes the predecessor transmitting function. Description will be made later of details of the predecessor transmitting function. By the predecessor transmitting function, the data transfer unit 115 transmits the routing table update request to the predecessor of routing key tr (Step S73). The routing table update request includes information on the routing key r, the event key e, the address a, the routing key pr of the predecessor of r and the distance d.

A routing table update unit of a distributed processing device (hereinafter, referred to as an update object distributed processing device) of a target of said routing table update processing receives the routing table update request via the data transfer unit.

The routing table update unit of the update object distributed processing device updates the routing table which the routing table storage unit stores based on the routing table update request received from other distributed processing device.

Figure 14:
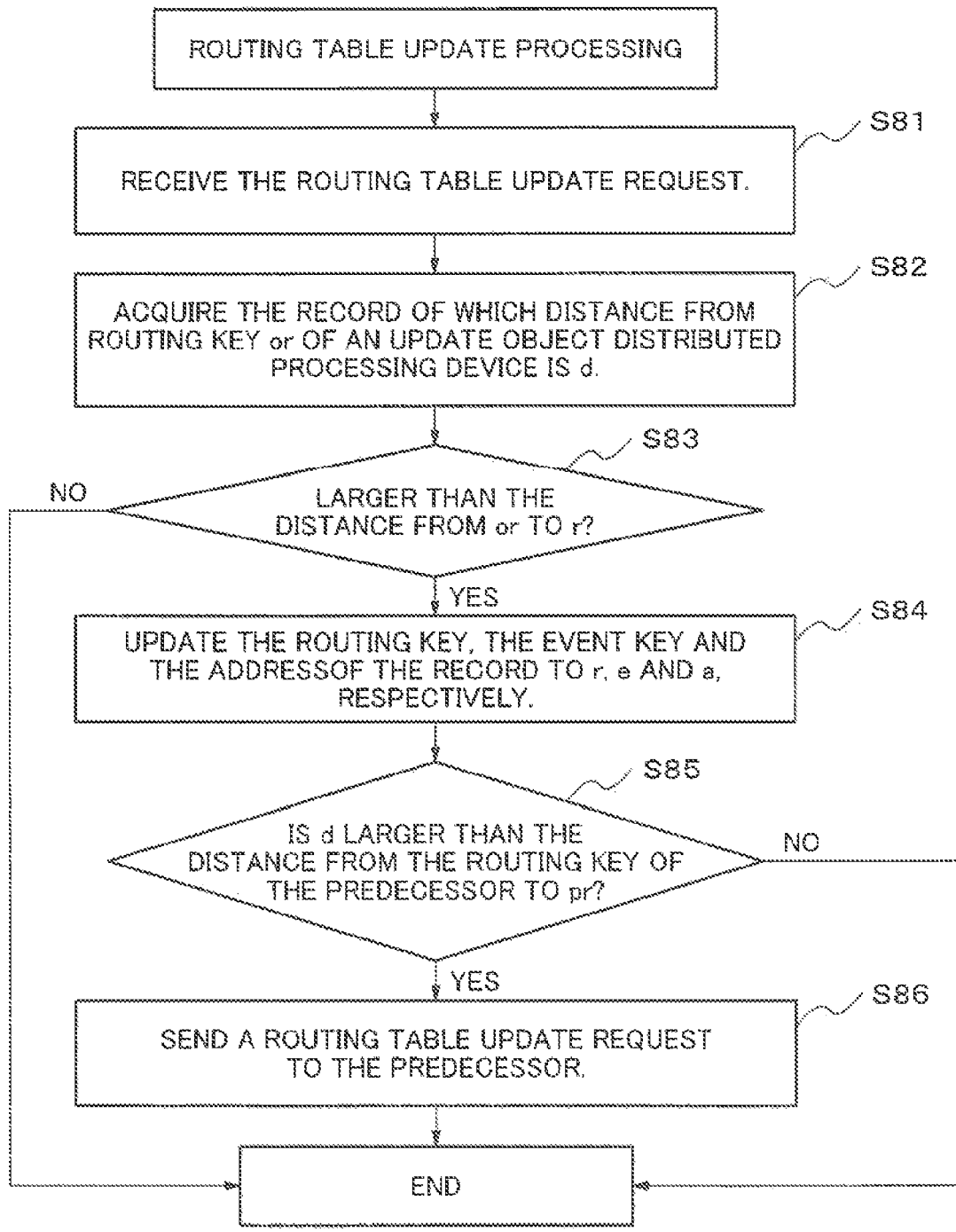
FIG. 14 It is a flow chart diagram of routing table update processing which the update object distributed processing device performs.

FIG. 14 is a flow chart diagram of routing table update processing which the update object distributed processing device performs. As shown in FIG. 14, first, the data transfer unit of the update object distributed processing device receives a routing table update request from the data transfer unit 115 (Step S81). The data transfer unit of the update object distributed processing device outputs the routing table update request to the routing table update unit.

Next, the routing table update unit into which the routing table update request was inputted acquires a tuple whose initial value is a value whose distance from the routing key or of the update object distributed processing device is d (Step S82).

The routing table update unit judges whether or not the distance from or to the routing key of the tuple is larger than the distance from or to r (Step S83).

When judging that the distance from or to the routing key of the tuple is larger than the distance from or to r, the routing table update unit updates a routing key, an event key and an address of the tuple to r, e and a respectively (Step S84). This update is performed so that the distributed processing device which has a routing key r with the smallest distance from the initial value will be a successor of the initial value.

When it is judged that the distance from or to the routing key of the tuple is smaller than the distance from or to r, the routing table update unit ends the routing table update processing.

After Step S84, the routing table update unit judges whether or not d is larger than the distance from the routing key of the predecessor of the update object distributed processing device to pr (Step S85).

When judging that d is larger than the distance from the routing key of the predecessor of the update object distributed processing device to pr, the routing table update unit transmits a routing table update request to the predecessor of the update object distributed processing device via the data transfer unit (Step S86).

When judging that d is smaller than the distance from the routing key of the predecessor of the update object distributed processing device to pr, the routing table update unit ends the routing table update processing.

The routing table storage unit stores the routing table updated by the above-mentioned routing table update processing.

Here, operation which transmits the event data will be described in detail when the data transfer unit 115 receives the event data. It is assumed that the event key d is obtained by a hash function from the event data.

Figure 15:
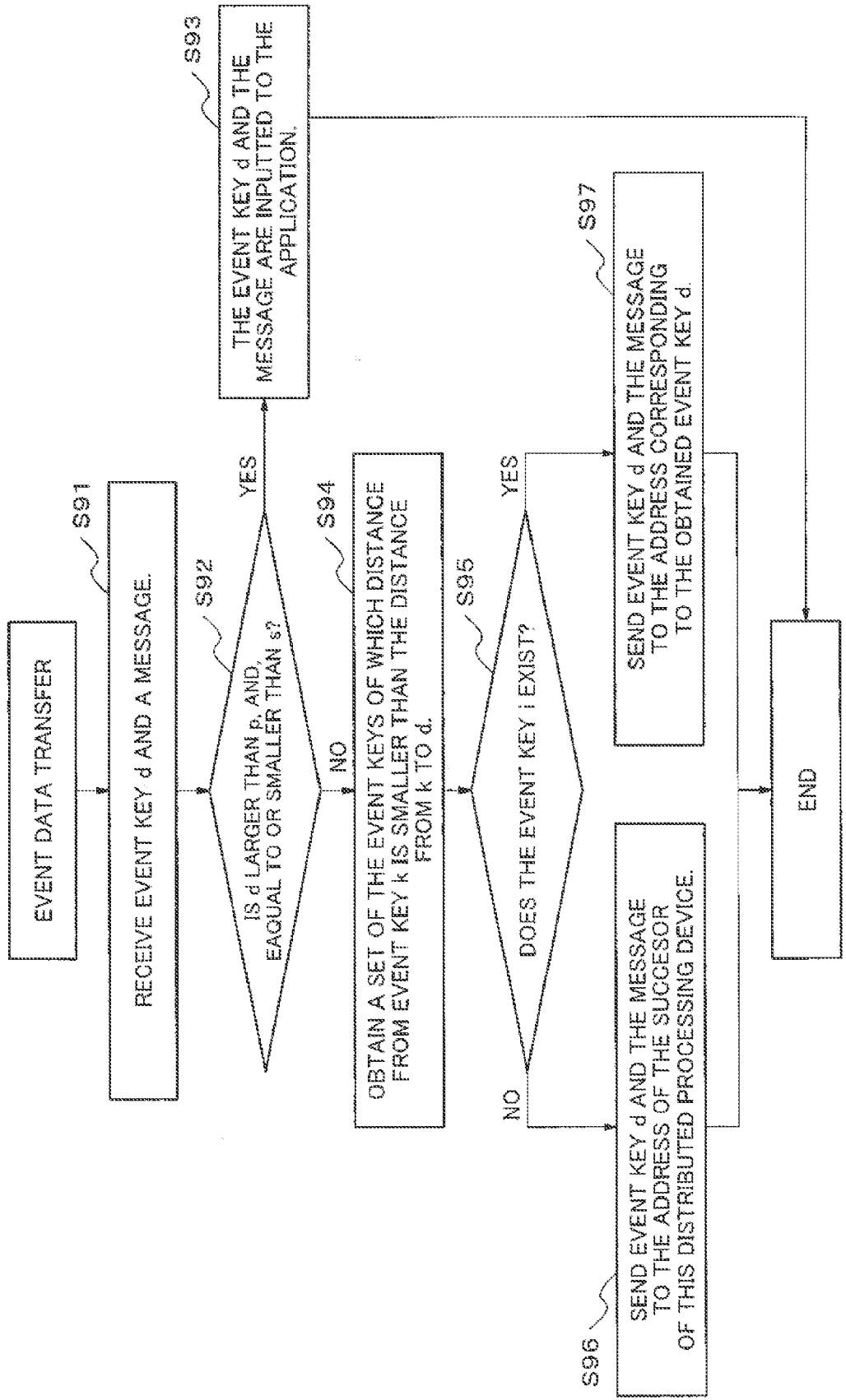
FIG. 15 FIG. 15 is a flow chart diagram representing operation from which a data transfer unit 115 transmits event data.

FIG. 15 is a flow chart diagram representing operation from which the data transfer unit 115 transmits event data. As shown in FIG. 15, first, the data transfer unit 115 of the distributed processing device 100 receives the event key d and a message (Step S91).

The data transfer unit 115 refers to the predecessor storage unit 114, and judges whether d is larger than the event key p of the predecessor of the distributed processing device 100, and is equal to or less than the event key s of the distributed processing device 100 (Step S92).

When judging that d is larger than the event key p of the predecessor of the distributed processing device 100, and is equal to or less than the event key s of the distributed processing device 100, the data transfer unit 115 judges that the distributed processing device 100 is the successor of d. In this case, the data transfer unit 115 inputs d and the message to the application of the distributed processing device 100 (Step S93).

When judging that d is larger than the event key p of the predecessor of the distributed processing device 100, and is larger than the event key s of the distributed processing device 100, the data transfer unit 115 judges that the distributed processing device 100 is not a successor of d.

In this case, the data transfer unit 115 obtains a set of event keys whose distance from the event key k of the distributed processing device 100 is smaller than the distance from k to d among the event keys of the tuple registered in the routing table (Step S94).

Next, the data transfer unit 115 judges whether an event key i with the largest distance from k exists in the obtained set (Step S95).

When judging that the event key i (event key with the largest distance from k) does not exist, the data transfer unit 115 judges that the distributed processing device 100 is the predecessor of d (Step S96). In this case, the data transfer unit 115 acquires an address of the successor of the distributed processing device 100 from the routing table and transmits the event key d and the message to the address thereof (Step S96).

When judging that the event key i exists, the data transfer unit 115 judges that other distributed processing device is the predecessors of d. In this case, the data transfer unit 115 transmits the event key d and the message to an address corresponding to the obtained event key i (Step S97).

The data transfer unit 115 of the distributed processing device 100 has the function (the predecessor transmitting function) of transmitting data to a predecessor of a specified event key in order to transmit a routing table update request.

Figure 16:
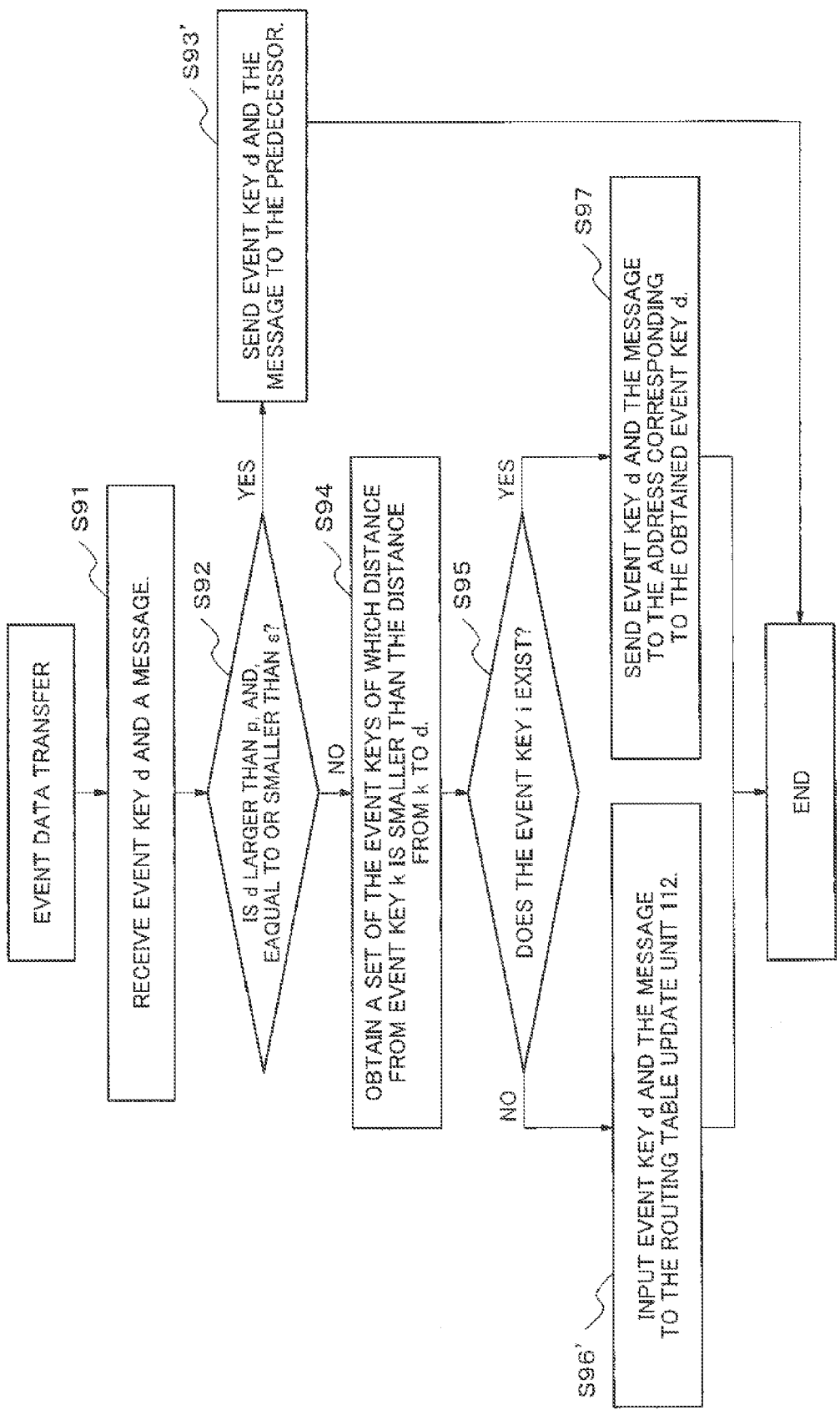
FIG. 16 It is a flow chart diagram representing operation from which the data transfer unit 115 transmits data by the predecessor transmitting function.

FIG. 16 is a flow chart diagram showing an operation of the data transfer unit 115 which transmits data by the predecessor transmitting function. As shown in FIG. 16, only Step S93 and Step S96 in the flow chart diagram of FIG. 15 are changed to Steps S93' and Step S96' in the predecessor transmitting function thereof.

In step S93', the data transfer unit 115 transmits the event key d and the message to the predecessor of the distributed processing device 100.

In step S96', the data transfer unit 115 inputs the event key d and the message to the routing table update unit 112.

As it has been described above, according to the distributed processing system concerning the first exemplary embodiment, it becomes possible to make a network load and a CPU load balance independently. The reason is because the role for a transmission of event data and the role for dividing a management section of event data which one key had played so far were separated as the role of each two keys (a routing key and an event key).

FIG. 7 is a diagram for explaining the effect of the distributed processing system in this exemplary embodiment. FIG. 7 shows an effect when making a CPU load and a network load balance in a distributed processing system including eight distributed processing devices, assuming that the distribution of the hash value becomes as it is shown in FIG. 4. A routing key, an event key, a number of event data transfer and a number of notified event data of each distributed processing device are shown in FIG. 7.

In FIG. 7, the number of notified event data is made uniform among each distributed processing device by making the event key same as the distributed processing device ID shown in FIG. 6. The CPU load is made uniform by making the event key same as the distributed processing device ID shown in FIG. 6.

In FIG. 7, the routing keys are set at equal intervals like the distributed processing device ID shown in FIG. 5. The number of the other distributed processing devices to which a routing table generated based on the routing key refers, and the number referred to from other distributed processing devices are made uniform in all distributed processing devices by making the event key same as the distributed processing device ID shown in FIG. 5. Therefore, when a distributed processing device which receives event data which inputted from an external system determines uniformly at random, the event number of data transfers becomes uniform as shown in FIG. 7.

Thus, both of a number of notified event data and a number of event data transfer become uniform by separating the role for a transmission of event data and the role for dividing a management section of event data that one key was playing until now as a role of each two keys. That is, a CPU load and a network load become uniform.

Second Exemplary Embodiment

Figure 17:
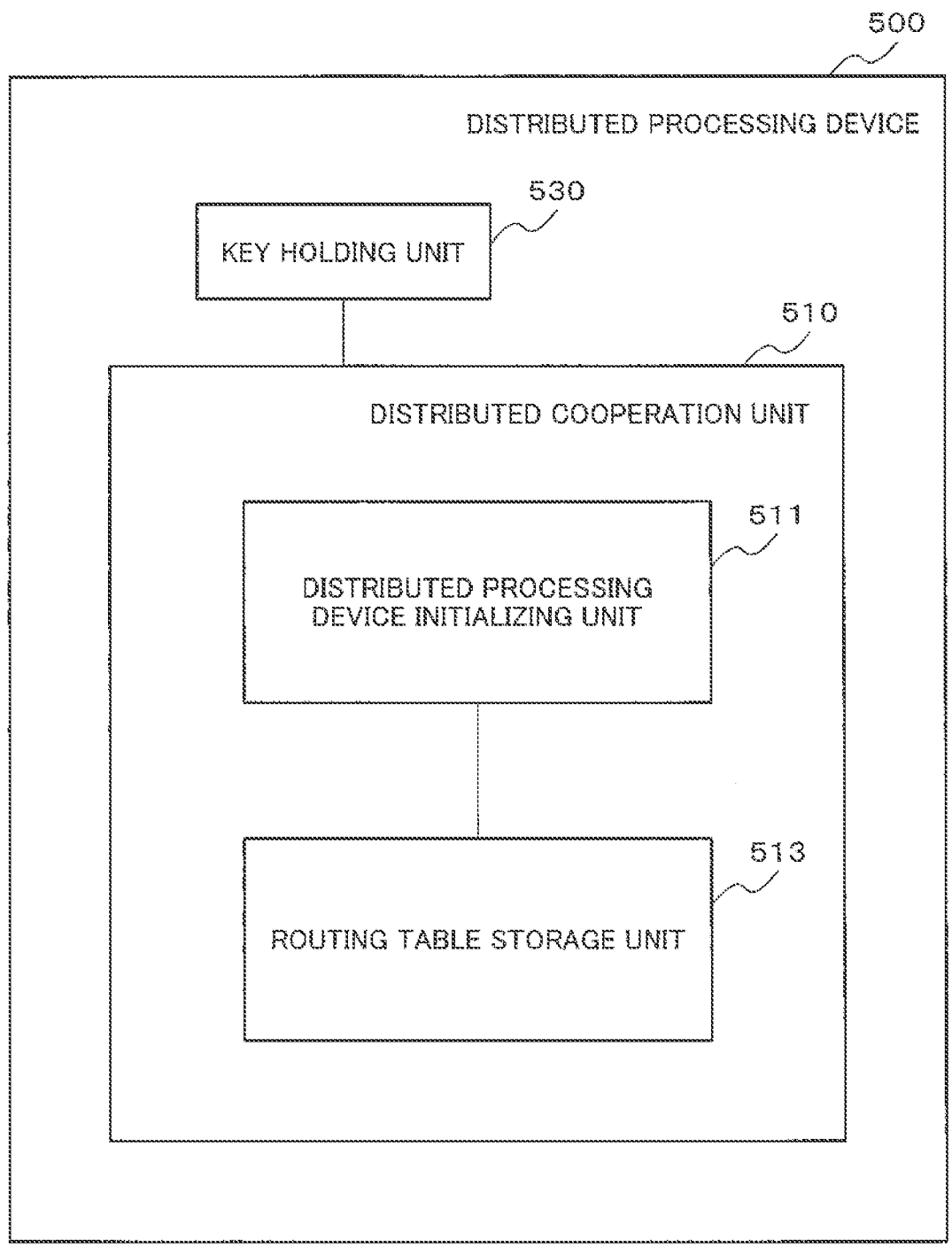
FIG. 17 It is a diagram showing an example of configuration of a second exemplary embodiment of the present invention.

FIG. 17 is a diagram showing an exemplary configuration of a second exemplary embodiment of the present invention. As shown in FIG. 17, the second exemplary embodiment of the present invention is a distributed processing device 500 including a distributed processing device initializing unit 511 and a routing table storage unit 513.

The distributed processing device 500 includes a distributed cooperation unit 510 and a key holding unit 530. The distributed cooperation unit 510 includes the distributed processing device initializing unit 511 and the routing table storage unit 513.

The key holding unit 530 holds a routing key which is a key (value) for which order relation is defined and is used for routing data, and an event key which is a key (value for which order relation is defined with relation to the routing key, and is used for management of a data.

The distributed processing device initializing unit 511 registers into the routing table a tuple including an event key and an address of a distributed processing device holding a routing key which has a predetermined relation with the routing key.

The routing table storage unit stores a routing table holding zero or more of tuple.

By building a system by a distributed processing device according to the second exemplary embodiment of the present invention, it becomes possible to make a CPU load and a network load balance independently. The reason is because the role for a transmission of event data and the role for dividing a management section of event data which one key had played so far were separated as the role of each two keys.

EXAMPLE

Henceforth, an example of the present invention is shown. This example is a distributed processing system including eight distributed processing devices, and it is assumed that the distribution of the hash value of the event data becomes as shown in FIG. 4.

Figure 18:
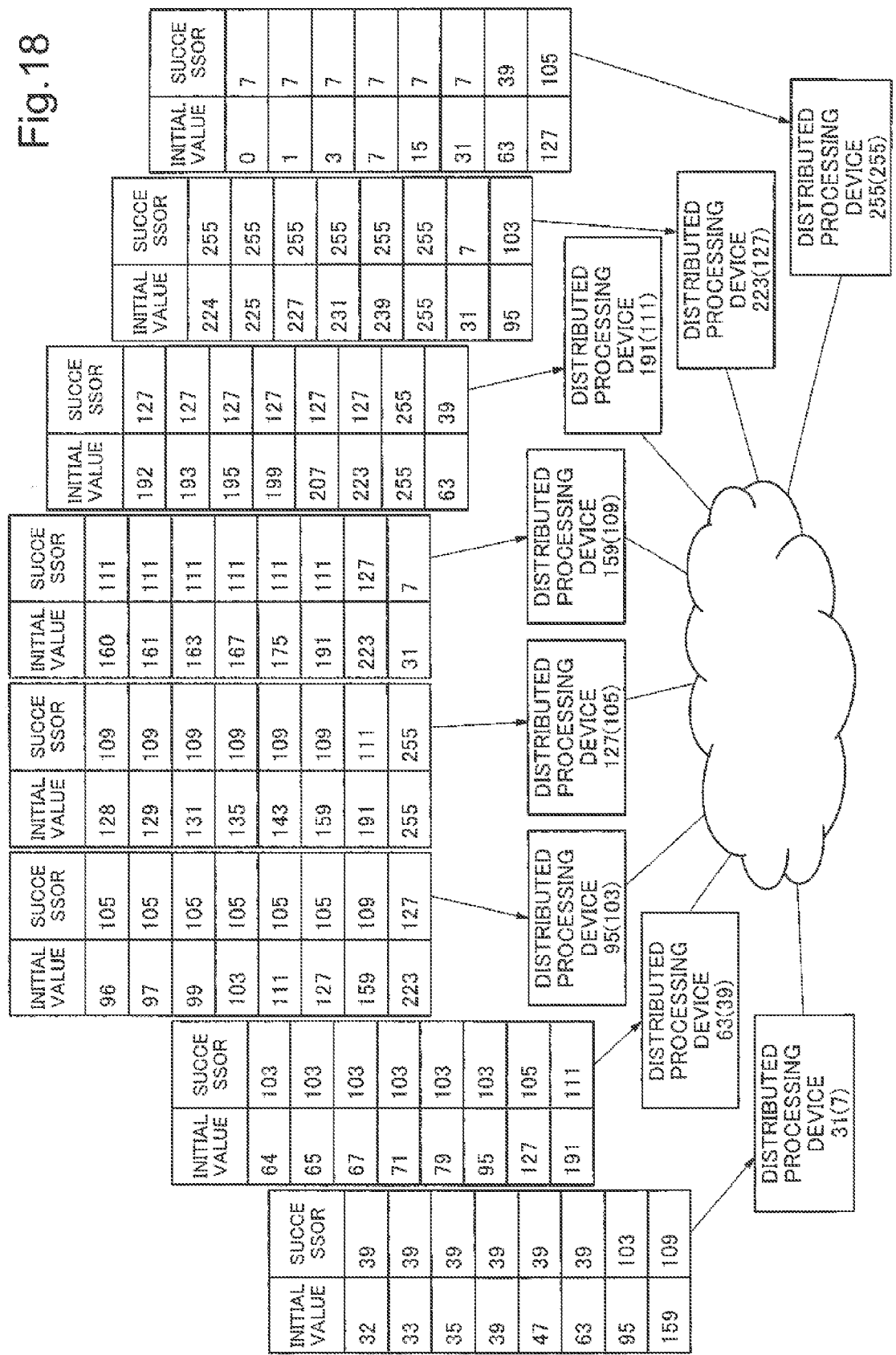
FIG. 18 It is a diagram showing an example of a distributed processing system to which the present invention was applied.

FIG. 18 is a diagram showing an example of a distributed processing system to which the present invention is applied. FIG. 18 shows a routing key, an event key and a routing table of each distributed processing device when balancing a network load with a CPU load in a distributed processing system to which the present invention is applied.

A value written in the block of a distributed processing device in FIG. 18 is a routing key, and a value given by a parenthesis is an event key. A key holding unit of the respective distributed processing devices holds a routing key and an event key. The table in the upper part of each distributed processing device is a routing table. The item of the successor on the routing table represents an event key of the successor. Further, because an address of a successor corresponds to an event key in 1 to 1, the description thereof is omitted.

When a distributed processing device whose routing key is a is written as a distributed processing device a, for example in routing key transcribes which is a with, for example, in the distributed processing device 31, a successor of the initial value 32 is the distributed processing device 63. An event key 39 of the distributed processing device 63 is registered in the routing table of the distributed processing device 31 in a pair with the initial value 32.

This example shows an example of a procedure in which a distributed processing device changed a routing key and event key first in order to make a CPU load and a network load uniform.

Figure 19:
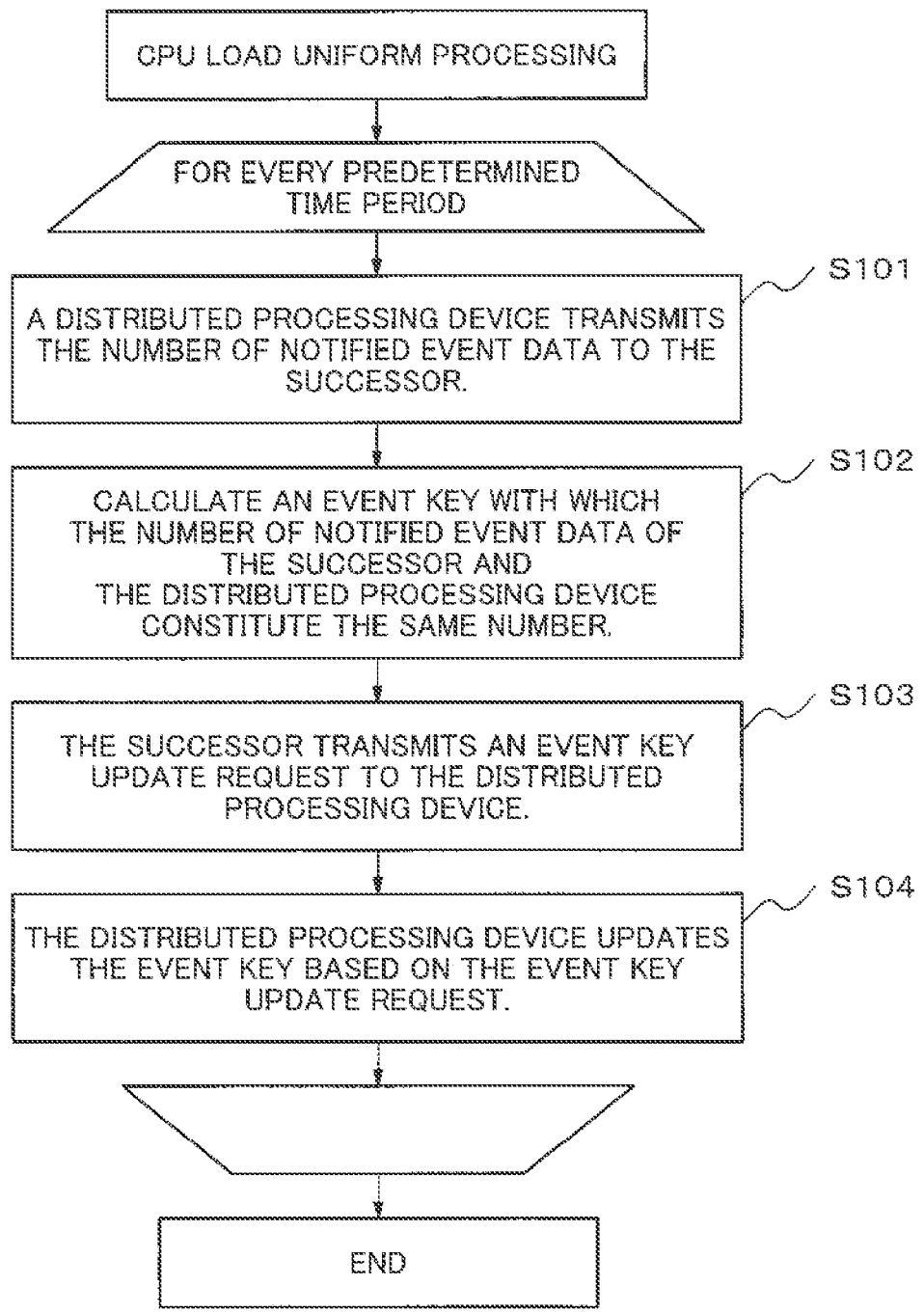
FIG. 19 It is a flow chart diagram of the CPU load uniform processing performed between the distributed processing device and the successor of the distributed processing device.

FIG. 19 is a flow chart diagram of CPU load uniform processing performed between the distributed processing device and the successor of the distributed processing device. CPU load uniform processing is the processing for changing an event key of the distributed processing device so that a number of notified event data of the distributed processing device and the successor become equal in order to make the CPU load uniform.

Specifically, first, a distributed processing device (d) transmits a number of notified event data to the successor of the distributed processing device (d) (Step S101).

The successor which received the number of notified event data calculates an event key of the distributed processing device (d) by which the number of notified event data of the successor and the distributed processing device (d) will be the same number (Step S102).

Next, the successor transmits an event key update request to the distributed processing device (d) to change the event key to the calculated event key (Step S103).

The distributed processing device (d) which received the event key update request updates the event key which the self-device holds based on the event key update request (Step S104).

In this example, it is assumed that each distributed processing device is measuring a number of notified event data of the self-device within the past predetermined time period. Each distributed processing device carries out the processing mentioned above periodically, thereby a number of notified event data of each distributed processing device will be converged on the same number.

Figure 20:
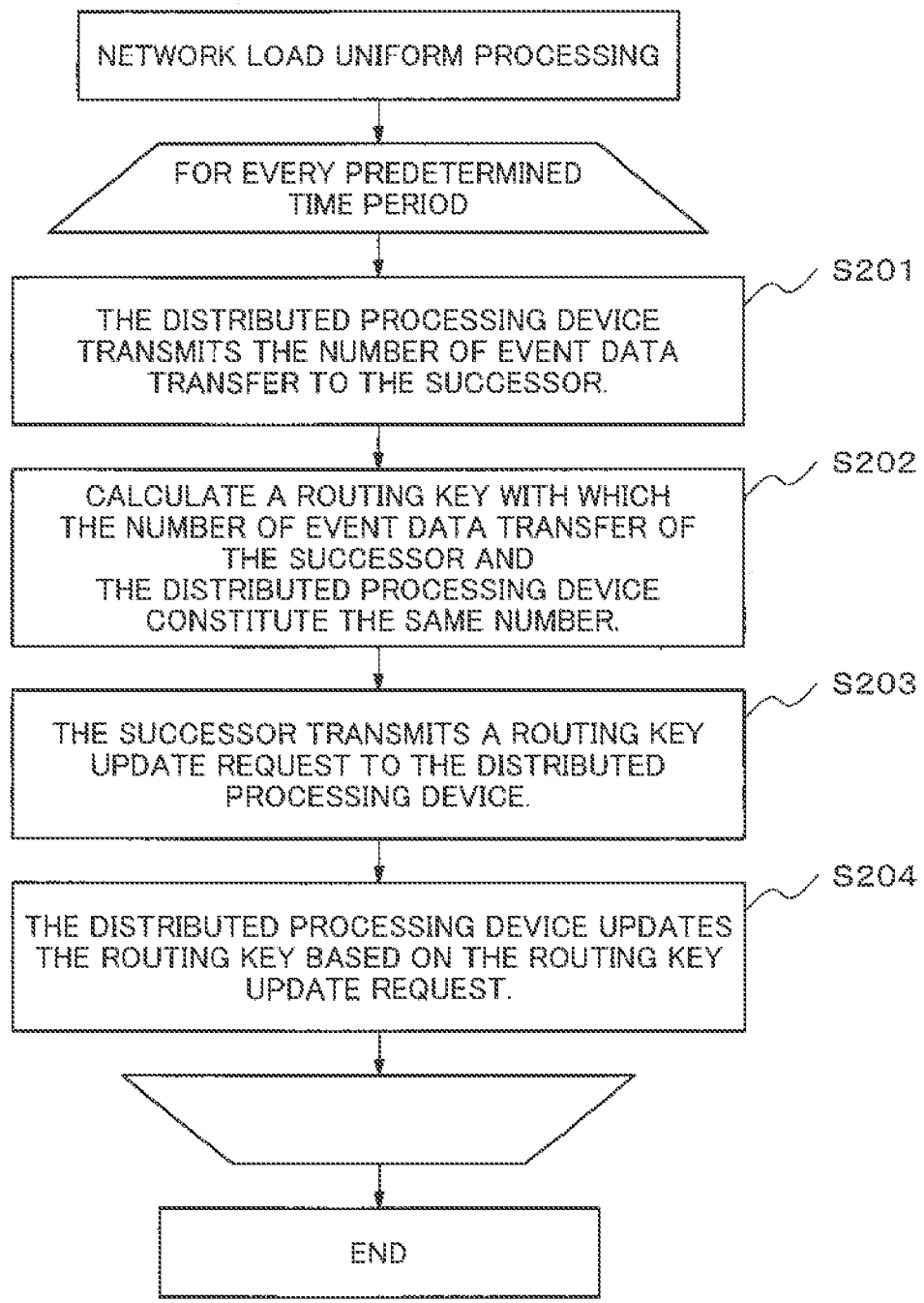
FIG. 20 It is a flow chart diagram of the network load uniform processing performed between the distributed processing device and the successor of the distributed processing device.

FIG. 20 is a flow chart diagram of network load uniform processing performed between the distributed processing device and the successor of the distributed processing device. Network load uniform processing is the processing for making the network load uniform.

Specifically, first, a distributed processing device (d) transmits a number of event data transfer to the successor of the distributed processing device (d) (Step S201).

The successor which received the number of event data transfer calculates a routing key of the distributed processing device (d) by which the number of event data transfer of the successor and the distributed processing device (d) will be the same number (Step S202).

Next, the successor transmits a routing key update request to the distributed processing device (d) so that a routing key of the distributed processing device (d) may be updated to the calculated routing key (Step S203).

The distributed processing device (d) which received the routing key update request updates a routing key which the self-device holds based on the routing key update request (Step S204).

For example, each distributed processing device measures the number of event data transfer appropriately. When the event number of data transfer of the distributed processing device (d) is larger than the event number of data transfers of the successor of the distributed processing device (d), the distributed processing device (d) updates a routing key to a smaller value.

Because the distributed processing device (d) come to be referred to by other less distributed processing devices by this update, the number of event data transfer decreases. Further, here, that the distributed processing device (d) is referred to by other distributed processing devices means the state that a key and an address of the distributed processing device (d) are registered in a routing table of other distributed processing devices.

On the other hand, by the above-mentioned update, because the successor of the distributed processing device (d) will be referred to by more other distributed processing devices, the number of event data transfer increases. When each distributed processing device carries out the processing mentioned above periodically, the event number of data transfer of each distributed processing device will be converged on the same number.

As long as it can make a CPU load and a network load uniform, any kind of method may be used as a method with which a distributed processing device calculates an event key and a routing key in order to make the CPU load and the network load uniform.

For example, measuring a CPU load or a number of event data transfer (hereinafter, referred to as an event key or the like), the distributed processing device may subtract 1 from a value of an event key or a routing key (hereinafter, referred to as a CPU load or the like), and may find an appropriate value.

Or for example, when wanting to halve a CPU load or the like, the distributed processing devices may set a value such as an event key of the distributed processing device to a value between the value of the present event key or the like and the value such as an event key of a predecessor simply.

Or supposing we would like to reduce a CPU load of a distributed processing device, for example, 20 percent, the distributed processing device may calculate an updated event key so that a self-device can calculate 20 percent of the whole may be calculated and the part thereof can be reduced in a key from which the self-device has received an event notification.

The distributed processing device may consider both load status of the CPU load and the network load and calculate an updated event key or the like. For example, the distributed processing device may consider the ratio of both loads and calculate an event key or the like as a CPU load and a network load will be a relation of an inverse proportion. Thereby, a total performance of an entire system can be improved.

Next, a concrete operation which transmits to a distributed processing device which should be processed will be described.

For example, it is assumed that a distributed processing device 31 received event data whose event key is 107. In this case, the distributed processing device 31 refers to the item of the successor on the stored routing table and transmits the event data to the distributed processing device 95 corresponding to the event key 103 with the smallest distance to 107. The distributed processing device 95 receives the event data from the distributed processing device 31.

Next, the distributed processing device 95 refers to the item of the successor on the stored routing table, and transmits the event data to the distributed processing device 127 corresponding to an event key 105 with the smallest distance to 107.

After that, the distributed processing device 127 refers to the stored routing table. The distributed processing device 127 judges that the event data 107 is the closest to 105 which is an event key of the self-device than any event key on the routing table of the distributed processing device 127. That is, the distributed processing device 127 judges that the self-device is a predecessor of the event key 107.

The distributed processing device 127 transmits the event data to the distributed processing device 159 which is a successor of the self-device 127. After that, a distributed processing device 159 finishes transmitting event data by notifying the application of the self-device of the received event data.

Although the present invention has been described with reference to each exemplary embodiment and an example as mentioned above, the present invention is not limited to the above-mentioned exemplary embodiment and the example. Various changes in the configurations and details of the invention of the present application which a person skilled in the art can understand within the scope of the invention of the present application can be made.

FIG. 21 is a block diagram showing an example of a hardware configuration of the distributed processing device 500 according to the second exemplary embodiment mentioned above.

As shown in FIG. 21, each unit which constitutes the distributed processing device 500 is realized by a computer device including a CPU (Central Processing Unit) 1, communication IF 2 (communication interface 2) for network connections, a memory 3 and a storage device 4 such as a hard disk which stores a program. However, the configuration of the distributed processing device 500 is not limited to the computer device shown in FIG. 21.

The CPU 1 operates an operating system and controls the whole distributed processing device 500. The CPU 1 reads a program and data from a recording medium loaded on a drive device, for example to the memory 3 and carries out various processing according to this.

The storage device 4 is an optical disc, a flexible disc, a magnetic optical disc, an external hard disk, a semiconductor memory or the like, and records a computer program so that it is computer-readable. For example, the routine table storage unit which stores a routing table may be available as the storage device 4. The computer program may be downloaded from an external computer not shown connected to a communication network.

The input devices 5 are a mouse and a keyboard, for example, and are devices for inputting event data.

For example, the output device 6 is a display or the like.

Further, the block diagram which is used in each exemplary embodiment described so far shows not a configuration of a hardware unit but a block of the functional unit. These function blocks are realized by any combination of hardware and software. The realization means of the parts of the distributed processing device 500 is not limited in particular. That is, the distributed processing device 500 may be realized by one device coupled physically, or it may be realized by plural devices such that two or more devices separated physically and connected by a wire or a wireless.

The program of the present invention should just be a program which makes a computer execute each operation described in each above-mentioned exemplary embodiment.

Although the present invention has been described with reference to each exemplary embodiment and an example as mentioned above, the present invention is not limited to the above-mentioned exemplary embodiment and the example. Various changes in the configurations and details of the invention of the present application which a person skilled in the art can understand within the scope of the invention of the present application can be made.

This application is based upon and claims the benefit of priority from Japanese Patent Application No. 2011-066204 filed on Mar. 24, 2011, the disclosure of which is incorporated herein its entirety.

DESCRIPTION OF THE NUMERALS

1 CPU
2 communication IF
3 memory.
4 storage device.
5 input device
6 output device
100, 200, 300, 400, 500 distributed processing device
110 distributed cooperation unit
111 distributed processing device initializing unit
112 routing table update unit
113 routing table storage unit
114 predecessor storage unit
115, 215 data transfer unit
120 application
130 key holding unit
511 distributed processing device initializing unit
513 routing table storage unit

The invention claimed is:

1. A distributed processing system including one or more distributed processing devices in a structured P2P network, the distributed processing device comprising:

at least one memory operable to store program instructions;

at least one processor operable to read the stored program instructions; and according to the stored program instructions, the at least one processor is configured to be operated as:

a key holding unit that holds a routing key which is a key (value) for which order relation is defined and used for routing data, and an event key which a key (value) for which order relation is defined with relation to the routing key, and is used for management of data;

a distributed processing device initializing unit that registers into a routing table a tuple including the event key and an address of the distributed processing device holding the routing key which has a predetermined relation with the routing key held in the key holding unit; and a routing table storing unit that stores the routing table holding the tuple; and a data transfer unit that:

inputs an external event key, which is the event key inputted from outside, into an application of a self-device when the event key is inputted, and a distance from a predecessor event key, which is the event key stored in a predecessor storage unit, to the external event key is smaller than a distance from the predecessor event key to a self-event key, which is the event key of a self-device;

obtains a transfer destination event key which is the event key with the smallest distance to the external event key from the event key of each tuple stored in the routing table, and the self-event key when a distance from the predecessor event key to the external event key is larger than a distance from the predecessor event key to the self-event key;

transmits the external event key to the successor of the self-device when the transfer destination event key is the self-event key; and transmits the external event key to an address of a tuple corresponding to the transfer destination event key when the transfer destination event key is not the self-event key.

2. The distributed processing system according to claim 1, wherein according to the stored program instructions, the at least one processor is further configured to be operated as:

a data transfer unit that acquires, when the event key is inputted from outside, a transfer destination event key which is an event key with the smallest distance from the event key inputted from outside among the event key of each of the tuple stored in the routing table, and transmits the event key inputted from outside to an address of the tuple corresponding to the transfer destination event key.

3. The distributed processing system according to claim 1, wherein, when a key whose distance from an arbitrary key k is d being defined as (k+d) mod 2m and a routing key whose distance from the routing key held in the key holding unit is $2^{(j-1)}$ (j=1, 2, . . . , m) being defined as an initial value, the distributed processing device holding the routing key which has the predetermined relation is the distributed processing device which holds the routing key with the smallest distance from the initial value.

4. The distributed processing system according to claim 1, wherein according to the stored program instructions, the at least one processor is further configured to be operated as a predecessor storage unit and a routing table update unit, the predecessor storage unit stores the event key of the distributed processing device (predecessor) holding the routing key with the largest distance from the routing key of the self-device, and an address, and the routing table update unit makes a value whose distance from the routing key of the self-device is 1 an initial value, registers into the routing table the tuple including the initial value, the event key of a successor of the self-device, and an address, stores the event key and an address which are stored in the predecessor storage unit of the successor of the self-device to the predecessor storage unit of the self-device, stores the event key of the self-device and an address to the predecessor storage unit of the successor, obtains the tuple which makes a value whose distance from the routing key of the predecessor is 1 an initial value from the routing table of the predecessor, and updates the event key and the address of the tuple into the event key and the address of the self-device.

5. The distributed processing system according to claim 1, wherein the distributed processing device updates the routing key of the self-device so that the number of notified event data becomes uniform with the successor by exchanging the number of notified event data with the successor of the self-device, and the key holding unit holds the routing key after the update.

6. The distributed processing system according to claim 5, wherein the distributed processing device transmits the number of notified event data of the self-device to the successor of the self-device for every predetermined time period, and when receives, from the successor which received the number of notified event data, the event key which the successor calculated so that the number of notified event data becomes uniform between the successor and the self-device and, the event key update request requesting the self-device to update the event key currently holding with the event-key calculated by the successor, updates the event key which the self-device holds based on the event key update request.

7. The distributed processing system according to claim 1, wherein the distributed processing device updates the event key of the self-device so that the number of event data transfer becomes uniform with the successor by exchanging the number of event data transfer with the successor of the self-device, and the key holding unit holds an event key after the update.

8. The distributed processing system according to claim 7, wherein the distributed processing device transmits the number of event data transfer of the self-device to the successor of the self-device for every predetermined time period, and when receives, from the successor which received the number of event data transfer, the routing key which the successor calculated so that the number of event data transfer becomes uniform between the successor and the self-device and, the routing key update request requesting the self-device to update the routing key currently holding with the routing-key calculated by the successor, updates the routing key which the self-device holds based on the routing key update request.

9. A distributed processing device on a structured P2P network, comprising:

at least one memory operable to store program instructions;

at least one processor operable to read the stored program instructions; and according to the stored program instructions, the at least one processor is configured to be operated as:

a key holding unit that holds a routing key which is a key (value) for which order relation is defined and is used for routing data, and an event key which is a key (value) for which order relation is defined with relation to the routing key, and is used for management of data;

a distributed processing device initializing unit that registers into a routing table a tuple including the event key and an address of the distributed processing device holding the routing key which has a predetermined relation with the routing key held in the key holding unit; and a routing table storage unit that stores the routing table holding the tuple; and a data transfer unit that:

inputs an external event key, which is the event key inputted from outside, into an application of a self-device when the event key is inputted, and a distance from a predecessor event key, which is the event key stored in a predecessor storage unit, to the external event key is smaller than a distance from the predecessor event key to a self-event key, which is the event key of a self-device;

obtains a transfer destination event key which is the event key with the smallest distance to the external event key from the event key of each tuple stored in the routing table, and the self-event key when a distance from the predecessor event key to the external event key is larger than a distance from the predecessor event key to the self-event key;

transmits the external event key to the successor of the self-device when the transfer destination event key is the self-event key; and transmits the external event key to an address of a tuple corresponding to the transfer destination event key when the transfer destination event key is not the self-event key.

10. The distributed processing device according to claim 9, wherein according to the stored program instructions, the at least one processor is further configured to he operated as:

a data transfer unit that acquires, when the event key is inputted from outside, a transfer destination event key which is an event key with the smallest distance from the event key inputted from outside among the event key of each of the tuple stored in the routing table, and transmitting the event key inputted from outside to an address of the tuple corresponding to the transfer destination event key.

11. The distributed processing device according to claim 9, wherein, when a key whose distance from an arbitrary key k is d being defined as (k+d) mod 2m and a routing key whose distance from the routing key held in the key holding unit is $2^{(j-1)}$ (j=1, 2, ..., m) being defined as an initial value, the distributed processing device holding the routing key which has the predetermined relation is the distributed processing device which holds the routing key with the smallest distance from the initial value.

12. The distributed processing device according to claim 11, further comprising a data transfer unit that inputs an external event key, which is the event key inputted from outside, into an application of a self-device when the event key is inputted, and a distance from a predecessor event key, which is the event key stored in a predecessor storage unit, to the external event key is smaller than a distance from the predecessor event key to a self-event key, which is the event key of a self-device, obtaining a transfer destination event key which is the event key with the smallest distance to the external event key from the event key of each tuple stored in the routing table, and the self-event key when a distance from the predecessor event key to the external event key is larger than a distance from the predecessor event key to the self-event key, transmitting the external event key to the successor of the self-device when the transfer destination event key is the self-event key, and transmitting the external event key to an address of a tuple corresponding to the transfer destination event key when the transfer destination event key is not the self-event key.

13. A routing table creation method in a distributed processing system including one or more distributed processing devices in a structured P2P network, the method comprising:

holding a routing key which is a key (value) for which order relation is defined and used for routing data, and an event key which is a key (value) for which order relation is defined with relation to the routing key, and is used for management of data;

registering into a routing table a tuple including the event key and an address of the distributed processing device holding the routing key which has the predetermined relation with the routing key;

storing the routing table holding the tuple;

inputting an external event key, which is the event key inputted from outside, into an application of a self-device when the event key is inputted, and a distance from a predecessor event key, which is the event key stored in a predecessor storage unit, to the external event key is smaller than a distance from the predecessor event key to a self-event key, which is the event key of a self-device;

obtaining a transfer destination event key which is the event key with the smallest distance to the external event key from the event key of each tuple stored in the routing table, and the self-event key when a distance from the predecessor event key to the external event key is larger than a distance from the predecessor event key to the self-event key;

transmitting the external event key to the successor of the self-device when the transfer destination event key is the self-event key; and transmitting the external event key to an address of a tuple corresponding to the transfer destination event key when the transfer destination event key is not the self-event key.

14. A non-transitory recording medium storing a program which makes a distributed processing device on a structured P2P network execute processing, the processing comprising:

holding a routing key which is a key (value) for which order relation is defined and used for routing data, and an event key which is a key (value) for which order relation is defined with relation to the routing key, and is used for management of data;

registering into a routing table a tuple including the event key and an address of the distributed processing device holding the routing key which has a predetermined relation with the routing key;

storing the routing table holding the tuple;

inputting an external event key, which is the event key inputted from outside, into an application of a self-device when the event key is inputted, and a distance from a predecessor event key, which is the event key stored in a predecessor storage unit, to the external event key is smaller than a distance from the predecessor event key to a self-event key, which is the event key of a self-device;

obtaining a transfer destination event key which is the event key with the smallest distance to the external event key from the event key of each tuple stored in the routing table, and the self-event key when a distance from the predecessor event key to the external event key is larger than a distance from the predecessor event key to the self-event key;

transmitting the external event key to the successor of the self-device when the transfer destination event key is the self-event key; and transmitting the external event key to an address of a tuple corresponding to the transfer destination event key when the transfer destination event key is not the self-event key.

* * * * *